(12) United States Patent
Kashu et al.

(10) Patent No.: US 8,708,087 B2
(45) Date of Patent: Apr. 29, 2014

(54) CONSTRUCTION MACHINE

(75) Inventors: Taku Kashu, Kasumigaura (JP); Hideki Haramoto, Kasumigaura (JP); Shohei Kamiya, Kasumigaura (JP); Yasushi Arai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 356 days.

(21) Appl. No.: 13/181,820

(22) Filed: Jul. 13, 2011

(65) Prior Publication Data
US 2012/0067660 A1 Mar. 22, 2012

(30) Foreign Application Priority Data
Sep. 16, 2010 (JP) .................................. 2010-207860

(51) Int. Cl.
*F01N 3/24* (2006.01)
(52) U.S. Cl.
USPC .......................................... 180/296; 180/291
(58) Field of Classification Search
USPC ............ 180/291, 296, 309, 89.2; 60/295, 301
See application file for complete search history.

(56) References Cited

U.S. PATENT DOCUMENTS

| | | | | |
|---|---|---|---|---|
| 7,523,804 B2 * | 4/2009 | Tanaka et al. | ................... | 180/291 |
| 8,186,156 B2 * | 5/2012 | Kamiya et al. | ................... | 60/420 |
| 8,276,370 B2 * | 10/2012 | Kamiya et al. | ................... | 60/286 |
| 8,365,518 B2 * | 2/2013 | Ezawa et al. | ..................... | 60/297 |
| 8,403,099 B2 * | 3/2013 | Yokota | ........................... | 180/309 |
| 8,459,014 B2 * | 6/2013 | Kamiya et al. | ................... | 60/295 |
| 2007/0079599 A1* | 4/2007 | Osaku et al. | ..................... | 60/283 |
| 2007/0090650 A1* | 4/2007 | Komiyama et al. | ......... | 290/40 C |
| 2011/0005853 A1* | 1/2011 | Kamiya | ......................... | 180/296 |
| 2011/0023472 A1* | 2/2011 | Saito et al. | ....................... | 60/311 |
| 2011/0030353 A1* | 2/2011 | Kamiya et al. | ................... | 60/297 |
| 2011/0036847 A1* | 2/2011 | Tam et al. | ....................... | 220/564 |
| 2013/0071295 A1* | 3/2013 | Terakawa et al. | ............. | 422/168 |

FOREIGN PATENT DOCUMENTS

| | | |
|---|---|---|
| EP | 1 845 205 A1 | 10/2007 |
| JP | 9-235752 A | 9/1997 |
| JP | 2002-061223 A | 2/2002 |
| JP | 2003-020936 A | 1/2003 |
| JP | 2008-240676 A | 10/2008 |
| JP | 2008240676 A * | 10/2008 |
| JP | 2009079422 A * | 4/2009 |
| JP | 2009-166713 A | 7/2009 |
| JP | 2010-236208 A | 10/2010 |
| WO | 2009/131561 A1 | 10/2009 |
| WO | WO 2009131561 A1 * | 10/2009 |

* cited by examiner

*Primary Examiner* — Katy M Ebner
(74) *Attorney, Agent, or Firm* — Mattingly & Malur, PC

(57) ABSTRACT

A fuel tank (12) is constructed such that a front flange portion (14A1) of a top surface plate (14A) of a second plate (14) extends outside in relation to a front surface plate (13B) of a first plate (13). As a result, a front surplus space (15A) projected in the upper and lower directions in a range of the front flange portion (14A1) of the top surface plate is formed in the front surface side of the front surface plate. A urea water tank (24) is arranged along the fuel tank (12) in such a manner that a rear side portion thereof enters into the front surplus space. Therefore, the rear side portion of the urea water tank can enter into the front surplus space using the front surplus space formed in the fuel tank (12), thereby increasing the tank capacity without downsizing the article accommodating box (16).

4 Claims, 16 Drawing Sheets

US 8,708,087 B2

CONSTRUCTION MACHINE

TECHNICAL FIELD

The present invention relates to a construction machine such as a hydraulic excavator mounting a NOx purifying device for removing nitrogen oxides in an exhaust gas and a urea water tank thereon.

BACKGROUND ART

Generally, a hydraulic excavator as a representative example of a construction machine is constituted by an automotive lower traveling structure, an upper revolving structure swingably mounted on the lower traveling structure, and a working mechanism liftably mounted on the front side of the upper revolving structure.

The upper revolving structure is provided with a revolving frame serving as a support structural member, an engine mounted at the rear side of the revolving frame, and a cab located at the left front side of the revolving frame to be positioned along the left side of the working mechanism, wherein an operator's seat in which an operator is seated and the like are provided in the cab.

A fuel tank is provided in the revolving frame to be positioned in the right side of the working mechanism for reserving fuel supplied to the engine, and an article accommodating box is provided in front of the fuel tank for accommodating articles such as tools, a grease gun, and various consumables.

On the other hand, a diesel engine is adopted as the engine in the hydraulic excavator, and the diesel engine is supposed to discharge a large amount of nitrogen oxides (hereinafter referred to as NOx) and the like. Therefore, a NOx purifying device for purifying NOx is as a post-treatment device of the exhaust gas in the diesel engine. The NOx purifying device, for example, is constructed to accommodate a urea selective reduction catalyst for removing NOx in the exhaust gas in an accommodating tubular casing provided in the halfway of an exhaust pipe of the engine. Therefore, the hydraulic excavator is provided with a urea water tank for reserving a urea solution as a reducing agent and a urea water injection valve for injecting the urea solution in the urea water tank toward the upstream side of the urea selective reduction catalyst, and the urea water tank is connected to the urea water injection valve by a connecting pipe.

In a case of providing the urea water tank in a hydraulic excavator, it is desired to set a tank capacity to be large for reducing the number of supply times of the urea solution. However, since many devices are mounted on the hydraulic excavator, it is difficult to furthermore secure a space for locating the urea water tank. Therefore, there are some cases where the conventional hydraulic excavator is constructed to accommodate the urea water tank in an article accommodating box for accommodating tools and the like (for example, Japanese Patent Laid-Open No. 2008-240676 A).

SUMMARY OF THE INVENTION

Incidentally, since the hydraulic excavator according to the Patent Document mentioned above is constructed to accommodate the urea water tank in the article accommodating box, in a case of increasing a capacity of the urea water tank, an effective accommodating space in the article accommodating box is reduced to be small, thus raising a problem that tools or consumables can not be accommodated therein.

Further, in a case of accommodating the urea water tank in the article accommodating box, there is a possibility that tools and the like in the article accommodating box become obstacles, which causes an operator to have a difficulty of accessing to the urea water tank, thus raising a problem of requiring labor hours for the urea water supply operation.

In view of the above-discussed problems with the conventional art, it is an object of the present invention to provide a construction machine which can improve operability at the time of supplying urea water by providing a large capacity of a urea water tank in a position of making it possible to have easy access thereto without downsizing an article accommodating box.

(1) A construction machine according to the present invention comprises a support frame forming a support structural member for a traveling structure, an engine mounted at the rear side of the support frame, a cab which is positioned at the front side of the support frame to be arranged in one side of the right and left directions and at which an operator boards, an oil reservoir tank arranged in the support frame in the other side of the right and left directions thereof for reserving fuel to be supplied to the engine or reserving operating oil to be used in a hydraulic system, an article accommodating box provided on the support frame to be positioned forward of the oil reservoir tank, a NOx purifying device provided in an exhaust pipe of the engine and equipped with a urea selective reduction catalyst for removing nitrogen oxides in an exhaust gas, a urea water tank formed of a hollow container for reserving urea water as a reducing agent, and a connecting pipe establishing connection between the urea water tank and the exhaust pipe of the engine.

To overcome the above-mentioned problems, the construction which the present invention adopts is characterized in that the oil reservoir tank is formed of an angular tubular or a cylindrical side surface plate forming an outer peripheral surface, a bottom surface plate closing a bottom surface of the side surface plate, and a top surface plate closing a top surface of the side surface plate and including a flange portion extending furthermore to an outside in relation to the side surface plate, a surplus space portion is formed in a side of the outer peripheral surface of the side surface plate to be projected in the upper and lower directions in a range of the flange portion of the top surface plate, and the urea water tank is arranged along the oil reservoir tank in such a manner as to enter into the surplus space portion.

With the arrangement just described, the surplus space portion can be formed in the side of the outer peripheral surface of the side surface plate of the oil reservoir tank to be projected in the upper and lower directions in a range of the flange portion of the top surface plate. Further, the urea water tank can be arranged along the oil reservoir tank in such a manner as to enter into the surplus space portion.

Meanwhile, since the urea water tank is constructed to enter into the surplus space portion by using the surplus space portion formed in the oil reservoir tank, a capacity of the urea water tank can be increased as compared to a case of accommodating the urea water tank in the article accommodating box.

As a result, even in a case of increasing the capacity of the urea water tank, a large accommodating space can be secured within the article accommodating box, thereby making it possible to sufficiently accommodate tools, consumables and the like therein. Further, since the urea water tank is arranged along the oil reservoir tank, it is possible to have easy access to the urea water tank at the time of filling urea water therein, and operability at the time of supplying the urea water can be improved.

(2) According to the present invention, the urea water tank is arranged in such a manner as to enter into the surplus space portion between the oil reservoir tank and the article accommodating box among the surplus space portion formed in the oil reservoir tank.

In consequence, the urea water tank having a large capacity can be arranged by using the surplus space portion at the front side of the oil reservoir tank and the space portion between the oil reservoir tank and the article accommodating box.

(3) According to the present invention, the oil reservoir tank is formed in an angular tubular shape by connecting a first plate formed in a U-shape in which a front surface plate and a rear surface plate respectively extend upwards from both sides of the bottom surface plate in the front and rear directions to a second plate having a dimension in the front and rear directions larger than a dimension of the first plate in the front and rear directions and formed in a reverse U-shape, in which a left surface plate and a right surface plate respectively extend downwards from both sides of the top surface plate in the right and left directions, a front flange portion is formed in the top surface plate to extend furthermore to the front side in relation to the front surface plate by a dimension difference between the first plate and the second plate in the front and rear directions, and the urea water tank is positioned in an outer peripheral side of the front surface plate of the oil reservoir tank to be arranged in such a manner as to enter into a front surplus space portion projected in the upper and lower directions in a range of the front flange portion of the top surface plate.

As a consequence, the oil reservoir tank can be formed only by connecting the first plate to the second plate and can be formed as a hollow container by the two plates. In this case, since the front flange portion may be formed in the top surface plate to extend furthermore to the front side in relation to the front surface plate by the dimension difference between the first plate and the second plate in the front and rear directions, the urea water tank may be positioned in the outer peripheral side of the front surface plate of the oil reservoir tank to be arranged in such a manner as to enter into the front surplus space portion projected in the upper and lower directions in a range of the front flange portion of the top surface plate. Therefore, the urea water tank having a large capacity can be arranged without sacrificing the installation space of the circumferential members.

(4) According to the present invention, the oil reservoir tank is formed in an angular tubular shape by connecting a first plate formed in a U-shape in which a front surface plate and a rear surface plate respectively extend upwards from both sides of the bottom surface plate in the front and rear directions to a second plate having a dimension in the front and rear directions larger than a dimension of the first plate in the front and rear directions and formed in a reverse U-shape, in which a left surface plate and a right surface plate respectively extend downwards from both sides of the top surface plate in the right and left directions, a front flange portion is formed in each of the top surface plate, the left surface plate and the right surface plate to extend furthermore to the front side in relation to the front surface plate by a dimension difference between the first plate and the second plate in the front and rear directions, and the urea water tank is positioned in an outer peripheral side of the front surface plate of the oil reservoir tank to be arranged in such a manner as to enter into a front surplus space portion projected in the upper and lower directions in a range of the front flange portion of the top surface plate and projected in the right and left directions in a range between the front flange portions of the left surface plate and the right surface plate.

In this case, the oil reservoir tank can be formed only by connecting the first plate to the second plate and can be as a hollow container by the two plates, and the effect similar to that of the above paragraph (3) can be obtained.

(5) According to the present invention, a front cover is provided between the oil reservoir tank and the article accommodating box, and the urea water tank is arranged along the oil reservoir tank in such a manner as to be concealed by the front cover. Therefore, the urea water tank can be concealed by the front cover to improve an external appearance.

(6) According to the present invention, a cushion material is provided between the side surface plate of the oil reservoir tank and a rear surface portion of the urea water tank for absorbing external vibrations. With this construction, even if the vibrations are generated at the time of a traveling time or an operation time of the construction machine, the vibrations can be absorbed by the cushion material, thereby making it possible to improve durability of the urea water tank.

MODE FOR CARRYING OUT THE INVENTION

Hereinafter, construction machines according to embodiments in the present invention will be in detail explained with reference to the accompanying drawings, by taking a crawler type hydraulic excavator as an example.

FIG. 1 to FIG. 10 show a first embodiment in the present invention. In the first embodiment, the case is illustrated in which a urea water tank is arranged along an oil reservoir tank to be positioned inside of a front cover.

Figure 1:
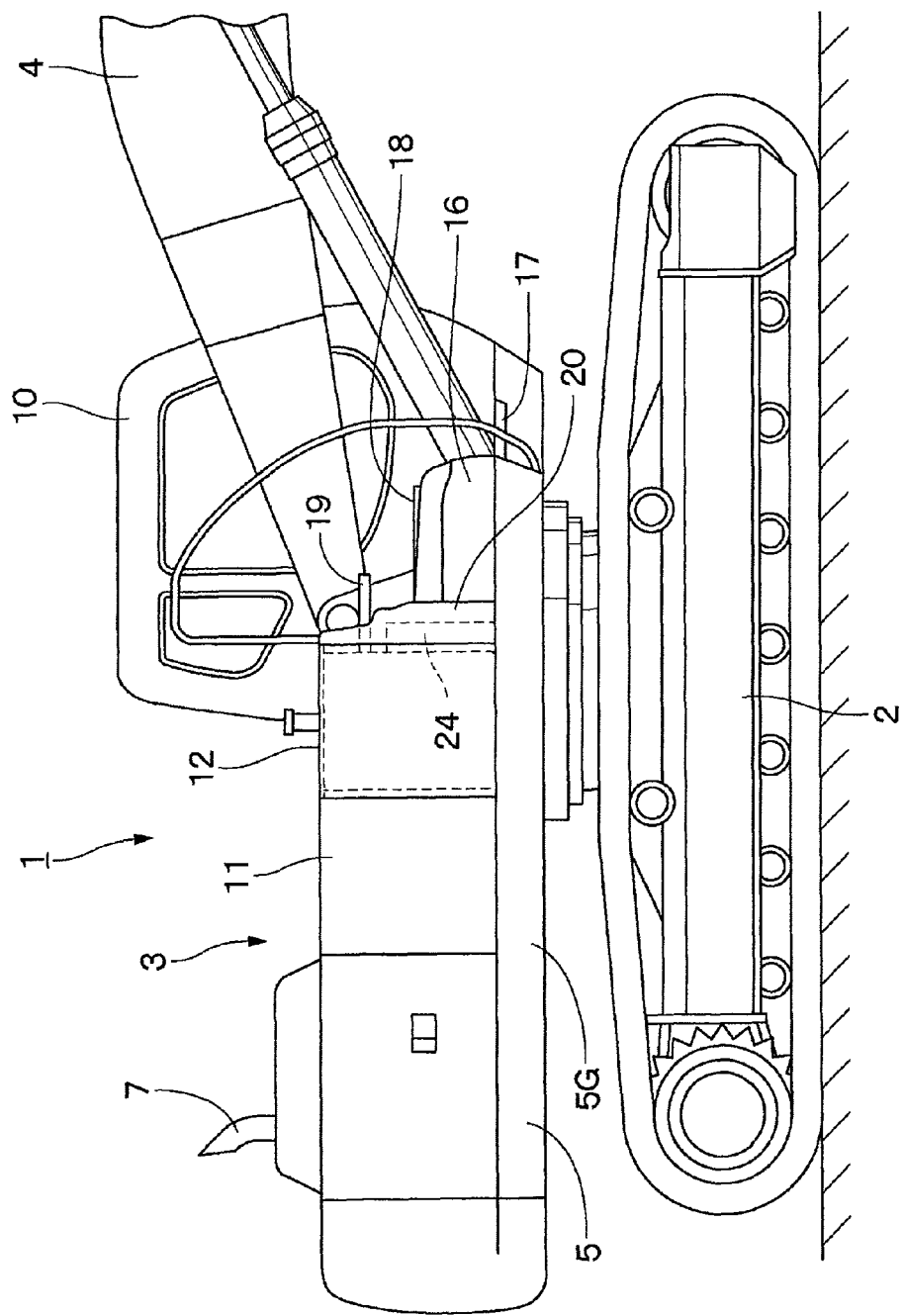
FIG. 1 is a front view showing a hydraulic excavator which is applied to a first embodiment of the present invention.

In FIG. 1, designated at 1 is a hydraulic excavator known as a representative example of a construction machine used in an excavating operation of earth and sand and the like. The hydraulic excavator 1 is largely constituted by an automotive crawler type lower traveling structure 2, an upper revolving structure 3 which is swingably mounted on the lower traveling structure 2 and constitutes a traveling vehicle together with the lower traveling structure 2, and a working mechanism 4 provided liftably on the front side of the upper revolving structure 3.

The upper revolving structure 3 is constituted by a revolving frame 5, an engine 6, a cab 10, an operating oil tank 11, a fuel tank 12, an article accommodating box 16, a front cover 20, a post-treatment device 21, a urea water tank 24, and the like, which will be described hereinafter.

Figure 2:
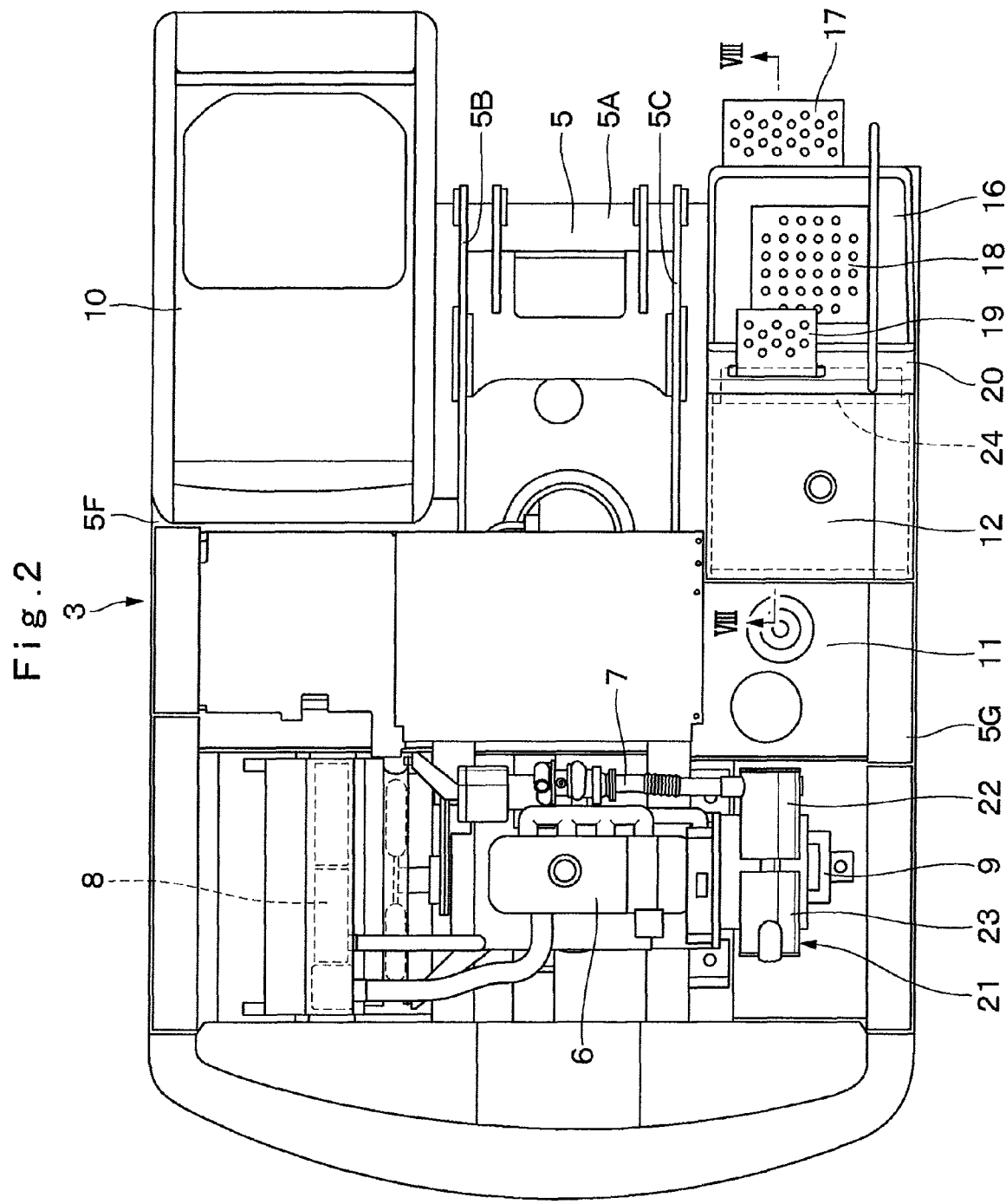
FIG. 2 is a plan view showing an upper revolving structure with a part of a housing cover being removed.

Denoted at 5 is the revolving frame as a support frame, which serves as a support structural member for the upper revolving structure 3. As shown in FIG. 2, the revolving frame 5 is, constituted by a thick bottom plate 5A extending in the front and rear directions, left and right vertical plates 5B and 5C provided upright on the bottom plate 5A and extending in the front and rear directions to be spaced by a predetermined interval in the right and left directions, a plurality of extension beams 5D and 5E (see FIG. 8) extending outwardly in the right and left directions from the respective vertical plates 5B and 5C to be arranged by an interval in the front and rear directions, and a left side frame 5F and a right side frame 5G mounted at distal ends of the respective extension beams 5D and 5E to be positioned in the outside in the right and left directions and extending in the front and rear directions.

Figure 8:
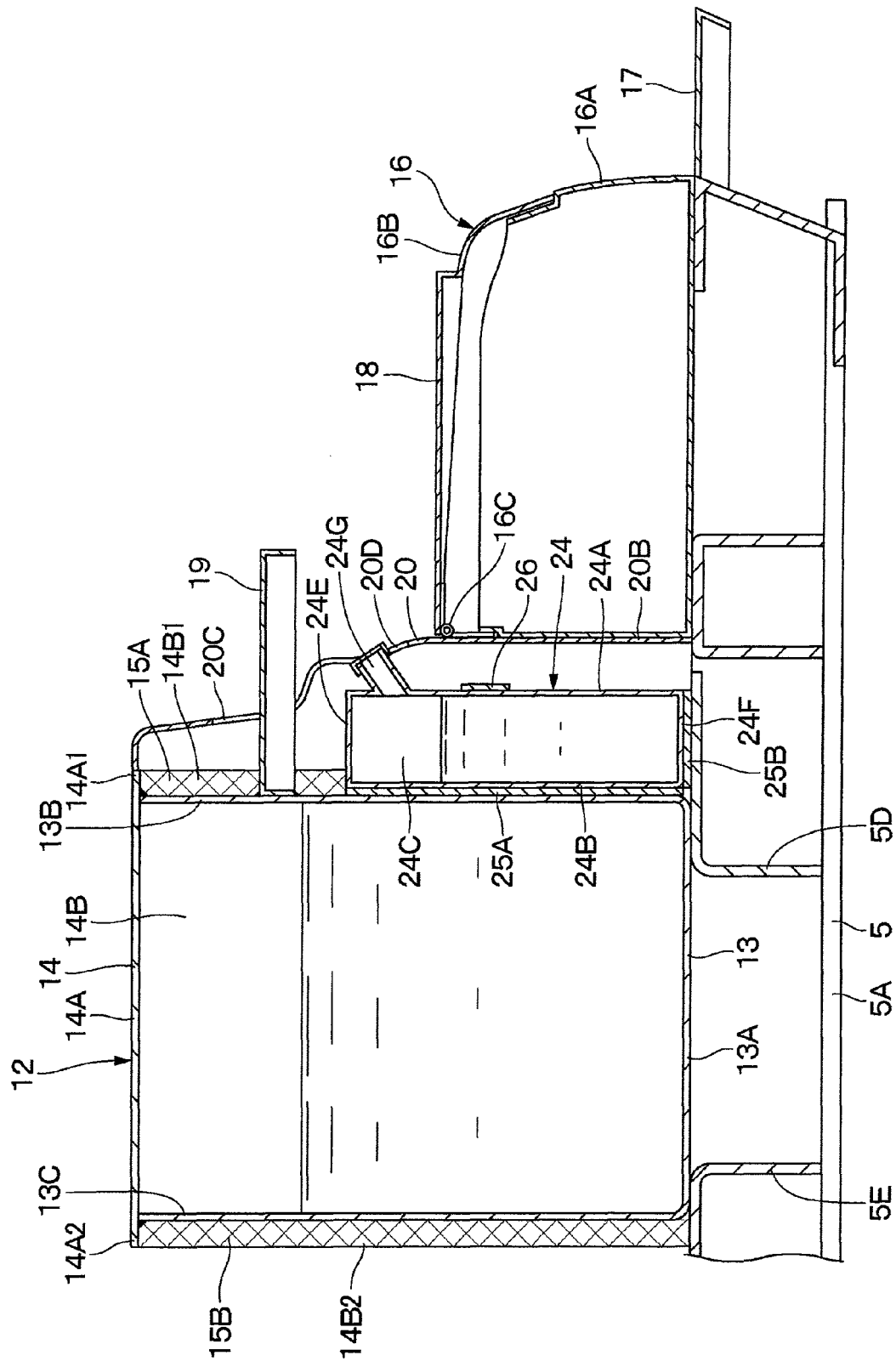
FIG. 8 is a longitudinal sectional view showing the revolving frame, the fuel tank, an article accommodating box, a urea water tank, and the like, taken in the direction of the arrows VIII-VIII of FIG. 2.

As shown in FIG. 8, the extension beam 5D positioned at the front side serves to support a front side portion of the fuel tank 12 to be described later. The extension beam 5D has an upper flat portion formed to extend forward, and therefore, the urea water tank 24 can be mounted on the extension beam 5D.

Indicated at 6 is the engine provided at the rear side of the revolving frame 5 (see FIG. 2), and the engine 6 is constructed as a diesel engine and mounted on the revolving frame 5 in a horizontal state. The engine 6 is provided with an exhaust pipe 7 for discharging an exhaust gas.

The diesel engine 6 achieves a high efficiency and is advantageous in durability, and on the other hand, has a defect that harmful substances such as particulate matter (PM) and nitrogen oxides (NOx) are discharged together with the exhaust gas. Therefore, as described later, the post-treatment device 21, which will be described later, mounted in the exhaust pipe 7 is provided with a PM trapping device 22 for removing the particulate matter, and a NOx purifying device 23 for removing the nitrogen oxides (NOx). The PM trapping device 22 and the NOx purifying device 23 are connected by a connecting pipe portion 7A in the exhaust pipe 7.

Indicated at 8 is a heat exchanger provided at the left side of the engine 6 (see FIG. 2), and the heat exchanger 8 is constituted by a radiator for cooling engine cooling water, an oil cooler for cooling operating oil, an intercooler for cooling air to be sucked for the engine 6, and the like. Indicated at 9 is a hydraulic pump mounted on the right side of the engine 6, and is driven by the engine 6 to discharge the operating oil from the operating oil tank 11 as pressurized oil.

Indicated at 10 is the cab provided in the left front side of the revolving frame 5. An operator boards at the cab 10 for operating the hydraulic excavator 1. An operator's seat in which an operator is seated, levers for operating various kinds of operations, a pedal and the like (any of them not shown) are located inside the cab 10.

Indicated at 11 is the operating oil tank as an oil reservoir tank provided in the right side of the revolving frame 5 to be positioned forward of the engine 6. The operating oil tank 11 is formed as a pressure tight tank in a rectangular shape extending in the upper and lower directions.

Designated at 12 is the fuel tank as an oil reservoir tank provided in the right side of the revolving frame 5 to be adjacent to the front side of the operating oil tank 11. The fuel tank 12 can reserve fuel enough for performing a predetermined working time operation. As shown in FIG. 4 to FIG. 9, the fuel tank 12 is constituted by a first plate 13 and a second plate 14, which will be described later, and the like.

Figure 7:
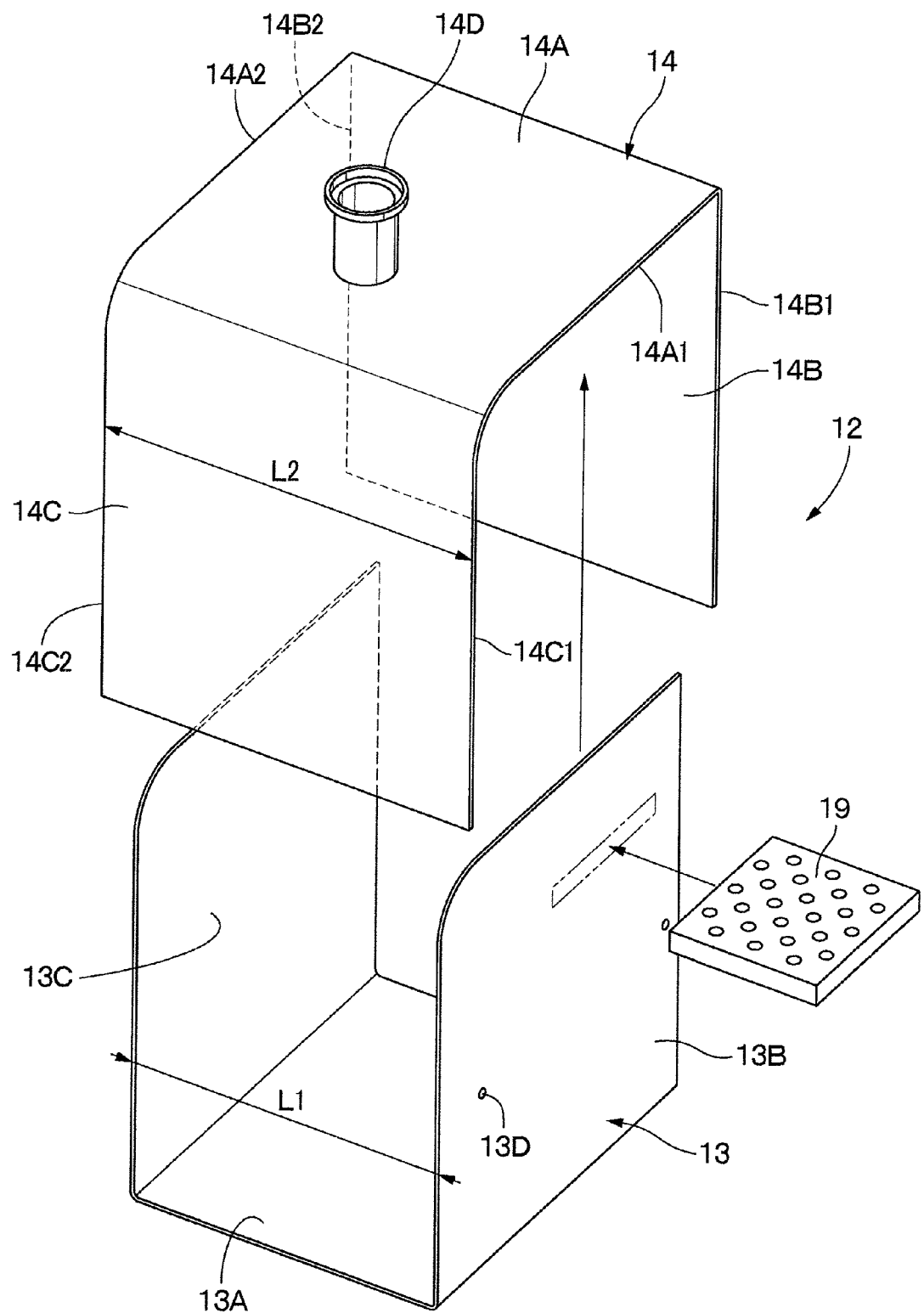
FIG. 7 is an exploded perspective view shown with the fuel tank being exploded.

Denoted at 13 is the first plate constituting the fuel tank 12. A dimension L1 of the first plate 13 in the front and rear directions is set to be smaller than a dimension L2 of the second plate 14 in the front and rear directions to be described later (L1<L2). The first plate 13 is formed by folding one sheet of a metallic plate carved out in a strip shape in a U-shape. That is, as shown in FIG. 7, the first plate 13 is formed by a rectangular bottom surface plate 13A extending in the horizontal direction to be positioned in the bottom side, a front surface plate 13B extending to be bent upward from the front side of the bottom surface plate 13A, and a rear surface plate 13C extending in parallel with the front surface plate 13B to be bent upward from the rear side of the bottom surface plate 13A.

Two screw holes 13D are provided in the front surface plate 13B in the intermediate position in the height direction to be spaced from each other in the right and left directions. Bolts 27 are screwed into the two screw holes 13D for mounting a fixing member 26 for fixing the urea water tank 24 to be described later. Meanwhile, a third step plate 19 to be described later is mounted in the upper position of the front surface plate 13B.

Denoted at 14 is the second plate provided to cover the first plate 13. A dimension L2 of the second plate 14 in the front and rear directions is set to be larger than a dimension L1 of the first plate 13 in the front and rear directions (L2>L1). The second plate 14 is, in the substantially same way as the first plate 13, formed by folding one sheet of a metallic plate carved out in a strip shape in a reverse U-shape. That is, the second plate 14 is constructed of a rectangular top surface plate 14A extending in the horizontal direction to be positioned in the top side, a left surface plate 14B extending to be bent downward from the left side of the top surface plate 14A, and a right surface plate 14C to be bent downward from the right side of the top surface plate 14A. A fuel filling opening 14D for supplying fuel into the fuel tank 12 is provided in the top surface plate 14A of the second plate 14.

Here, a description will be given on an assembly structure of the first plate 13 and the second plate 14 constituting the fuel tank 12. As described before, the width dimension L2 of the second plate 14 in the front and rear directions is set to be larger than the dimension L1 between the front surface plate 13B and the rear surface plate 13C as the dimension of the first plate 13 in the front and rear directions (L2>L1). Accordingly, as shown in FIG. 7, the front surface plate 13B and the rear surface plate 13C of the first plate 13 are arranged to be shifted by 90 degrees in the circumferential direction between the left surface plate 14B and the right surface plate 14C of the second plate 14, and a peripheral edge of the first plate 13 is welded to the second plate 14 air and liquid-tightly.

As a result, the fuel tank 12 is formed of a side surface plate in an angular tubular shape to have an outer peripheral surface formed of the front surface plate 13B and the rear surface plate 13C of the first plate 13 and the left surface plate 14B and the right surface plate 14C of the second plate 14. The bottom surface of the side surface plate is closed by the bottom surface plate 13A of the first plate 13, and further, the top surface of the side surface plate is closed by the top surface plate 14A of the second plate 14.

At this time, the top surface plate 14A of the second plate 14 constituting the side surface plate has a front flange portion 14A1 which corresponds to a front portion thereof extending furthermore to an outside in relation to the front surface plate 13B of the first plate 13 and a rear flange portion 14A2 which corresponds to a rear portion extending furthermore to an outside in relation to the rear surface plate 13C. Meanwhile, the left surface plate 14B of the second plate 14 has a front flange portion 14B1 which corresponds to a front portion thereof extending furthermore to an outside in relation to the front surface plate 13B and a rear flange portion 14B2 which corresponds to a rear portion thereof extending furthermore to an outside in relation to the rear surface plate 13C. In addition, the right surface plate 14C of the second plate 14 has a front flange portion 14C1 which corresponds to a front portion thereof extending furthermore to an outside in relation to the front surface plate 13B and a rear flange portion 14C2 which corresponds to a rear portion thereof extending furthermore to an outside in relation to the rear surface plate 13C. Namely, the front flange portions 14A1, 14B1, and 14C1 and the rear flange portions 14A2, 14B2, and 14C2 are formed by a dimension difference between the dimension L1 of the first plate 13 in the front and rear directions and the dimension L2 of the second plate 14 in the front and rear directions.

Denoted at 15A is a front surplus space portion formed in a front side position among the outer surface of the fuel tank 12, and the front surplus space portion 15A corresponds to a portion (portion shown in a lattice shape in FIG. 5 and FIG. 6) projected in the upper and lower directions in a range of the front flange portion 14A1 of the top surface plate 14A and projected in the right and left directions in a range between the front flange portion 14B1 of the left surface plate 14B and the front flange portion 14C1 of the right surface plate 14C.

Denoted at 15B is a rear surplus space portion formed in a rear side position among the outer surface of the fuel tank 12, and the rear surplus space portion 15B corresponds to a portion projected in the upper and lower directions in a range of the rear flange portion 14A2 of the top surface plate 14A and projected in the right and left directions in a range between the rear flange portion 14B2 of the left surface plate 14B and the rear flange portion 14C2 of the right surface plate 14C.

The front surplus space portion 15A and the rear surplus space portion 15B are a space formed without failure at the time of welding the two plates 13 and 14 to form the fuel tank 12. The urea water tank 24 is arranged in such a manner as to enter into the front surplus space portion 15A between the fuel tank 12 and the article accommodating box 16 among the front surplus space portion 15A and the rear surplus space portion 15B.

Further, a front side portion of the fuel tank 12 is mounted on the extension beam 5D positioned at the front side and on the right side frame 5G, and a rear side portion of the fuel tank 12 is mounted on the extension beam 5E positioned at the rear side of the extension beam 5D and on the right side frame 5G.

Here, the urea water tank 24 is arranged on the extension beam 5D at the front side on which the front side portion of the fuel tank 12 is mounted.

Indicated at 16 is the article accommodating box 16 provided in the right front portion of the revolving frame 5. The article accommodating box 16 accommodates tools for repair, a grease gun, consumables, hydraulic devices and the like, and is arranged forward of the fuel tank 12 to have a predetermined interval dimension thereto. The article accommodating box 16 is mounted on the revolving frame 5 and is formed by a boxy box portion 16A an upper side of which is opened and a lid portion 16B provided to close the top side of the box portion 16A. The lid portion 16B has a rear portion which is rotatably mounted on the box portion 16A through a hinge 16C, thus making it possible for the lid portion 16B to open/close toward the forward side.

Here, since the article accommodating box 16 does not accommodate the urea water tank 24 to be described later, a capacity thereof can be increased so that the article accommodating box 16 can accommodate tools and consumables according to amounts needed, and the tools and consumables can be easily taken out or in the article accommodating box 16. Meanwhile, in a case where the article accommodating box 16 accommodates hydraulic devices such as a control valve, a maintenance operation of the hydraulic device can be easily performed. Further, a second step plate 18 to be described later is provided integrally with the lid portion 16B of the article accommodating box 16.

Indicated at 17, 18, and 19 are three-stepped plates provided in the right front side of the upper revolving structure 3. The first step plate 17 is mounted in the right front portion of the revolving frame 5 to extend forward of the article accommodating box 16. The second step plate 18 is formed integrally with the lid portion 16B by flatly expanding on the lid portion 16B of the article accommodating box 16. The third step plate 19 is fixed to the top side portion of the front surface plate 13B in the first plate 13 constituting the fuel tank 12 at a position higher than the urea water tank 24 to be described later by welding means, screw means or the like.

Therefore, an operator steps on the three-stepped plates 17, 18, and 19 in that order from the lower traveling structure 2, and the operator can easily board on the upper revolving structure 3 to easily and safely perform an oil supply operation to the fuel tank 12, a water supply operation to the urea water tank 24, and the like.

Figure 3:
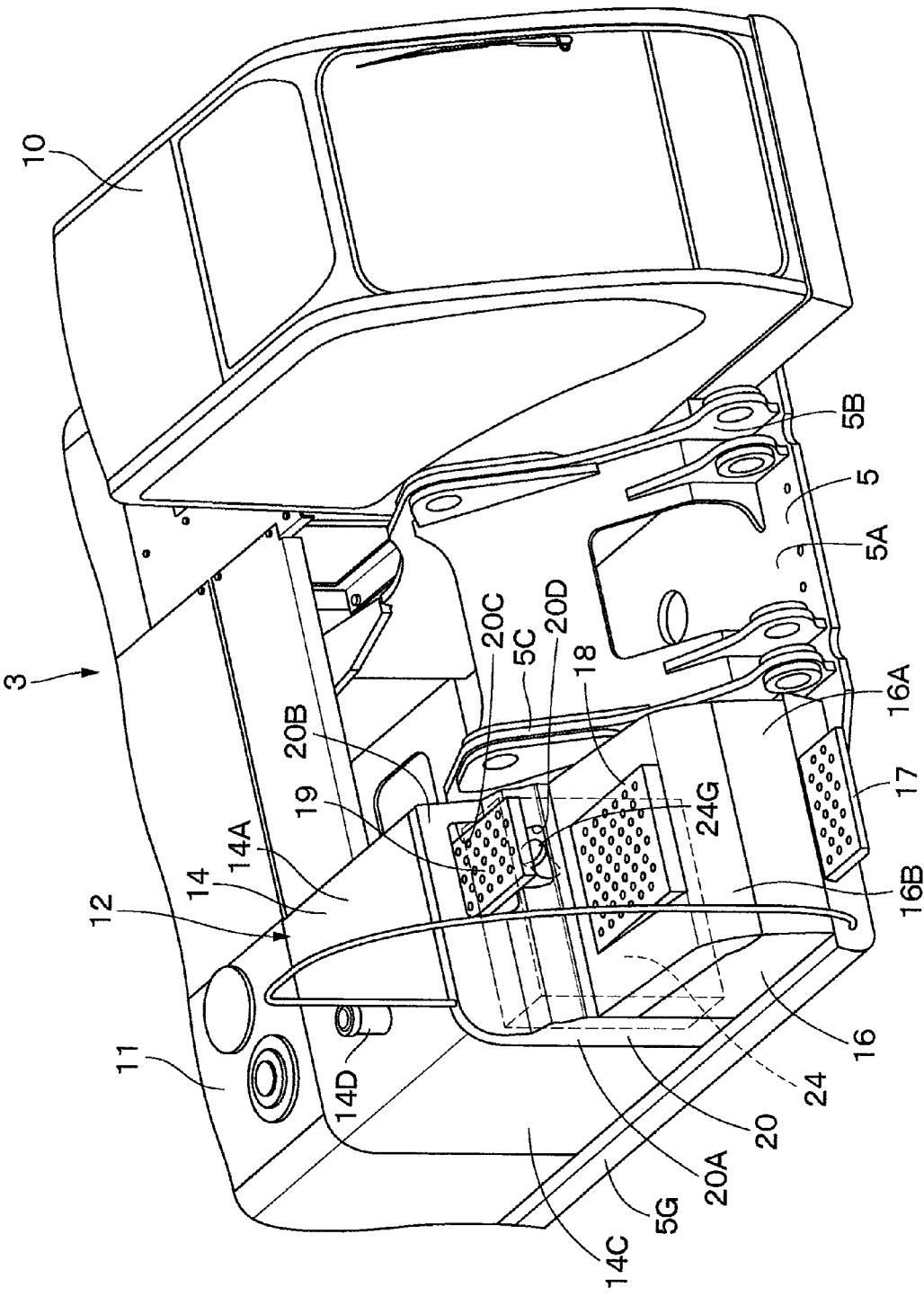
FIG. 3 is an external perspective view showing in enlarged form a front side portion of the upper revolving structure.

Indicated at 20 is the front cover provided between the fuel tank 12 and the backside of the article accommodating box 16. The front cover 20 serves to improve an external appearance by covering the portion between the fuel tank 12 and the backside of the article accommodating box 16. As shown in FIG. 3, the front cover 20 is formed of a side surface portion 20A provided to be connected to the right surface plate 14C of the second plate 14 in the fuel tank 12 forward thereof and a front surface portion 20B for closing the front side of the side surface portion 20A. Further, the front cover 20 is formed such that the upper side portion is narrow in width in the front and rear directions, for establishing a smooth connection between the fuel tank 12 and the article accommodating box 16. A step insert opening 20C is provided in the upper side portion of the front cover 20 for protruding the third step plate 19 forward, and a water supply opening 20D is provided under the step insert opening 20C for exposing a water supply port 24G of the urea water tank 24 to an outside.

Figure 10:
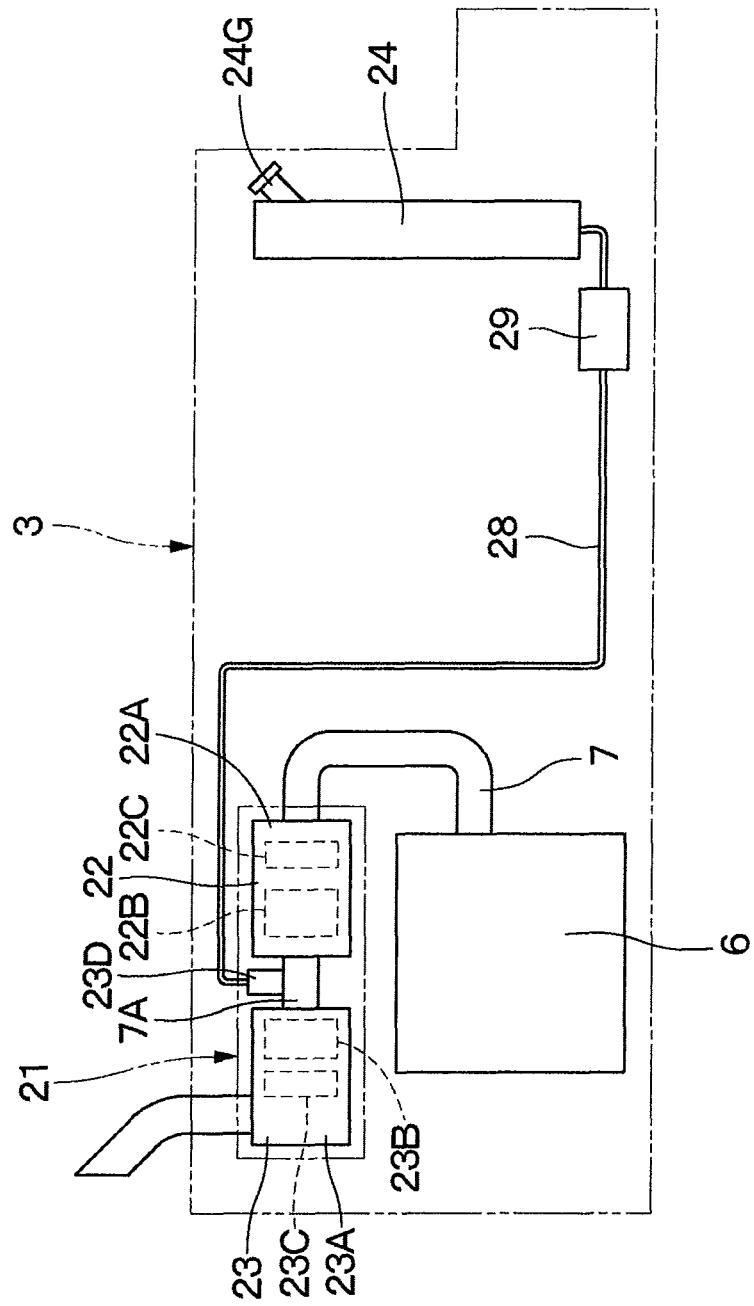
FIG. 10 is a construction diagram showing the construction of a post-treatment device together with an engine.

Next, the construction of the post-treatment device 22 equipped with the NOx purifying device 23 as the characterizing portion in the first embodiment will be explained with reference to FIG. 10 and the like.

Designated at 21 is the post-treatment device provided to be connected to the exhaust pipe 7 in the engine 6. The post-treatment device 21 is provided with the PM trapping device 22 to be described later for trapping and removing particulate matter (PM: Particulate Matter) in an exhaust gas and the NOx purifying device 23 to be described later for purifying the nitrogen oxides (NOx) in the exhaust gas by using a urea solution as a reducing agent. The post-treatment device 21 is largely constituted by the PM trapping device 22 and the NOx purifying device 23.

Indicated at 22 is the PM trapping device (particulate matter removing device) provided to be connected to the outlet side of the exhaust pipe 7 in the engine 6. The PM trapping device 22 serves to trap and remove particulate matter (PM) contained in an exhaust gas. The PM trapping device 22 is formed as a hollow tubular casing extending in the front and rear directions and is largely constituted by an accommodating tubular casing 22A having an upstream side (front side) connected to the exhaust pipe 7 in the engine 6, a PM trapping filter 22B accommodated in the accommodating tubular casing 22A, and an oxidation catalyst 22C arranged upstream of the PM trapping filter 22B.

The PM trapping device 22 oxides carbon monoxides (CO), hydrocarbon (HC) and the like contained in the exhaust gas for removal and removes nitrogen oxides (NO) as nitrogen dioxides ($NO_2$) by the oxidation catalyst 22C. Further, the PM trapping filter 22B traps particulate matter contained in the exhaust gas and burns the trapped particulate matter for removal.

Indicated at 23 is the NOx purifying device provided to be connected to the downstream side of the PM trapping device 22. The NOx purifying device 23 serves to purify nitrogen oxides (NOx) in the exhaust gas by using the urea solution. The NOx purifying device 23 is formed as a hollow tubular casing extending in the front and rear directions and is largely constituted by an accommodating tubular casing 23A connected to the downstream side (rear side) of the PM trapping device 22 through the connecting pipe portion 7A in the exhaust pipe 7, a urea selective reduction catalyst 23B accommodated in the upstream side of the accommodating tubular casing 23A, an oxidation catalyst 23C arranged downstream of the urea selective reduction catalyst 23B, and a urea water injection valve 23D provided upstream of the urea selective reduction catalyst 23B, for example, in the connecting pipe portion 7A in the exhaust pipe 7. Further, the urea water injection valve 23D is connected to the urea water tank 24 through a connecting pipe 28 and a supply pump 29 to be described later.

The NOx purifying device 23 injects a urea solution into the exhaust gas by the urea water injection valve 23D, and reduces NOx in the exhaust gas by using ammonia generated from the urea solution by the urea selective reduction catalyst 23B to water and nitrogen. The NOx purifying device 23 removes the ammonia in the exhaust gas by the oxidation catalyst 23C.

Next, the urea water tank 24 according to the first embodiment provided between the fuel tank 12 and the article accommodating box 16 will be described with reference to FIGS. 4, 8, 9 and the like.

Figure 4:
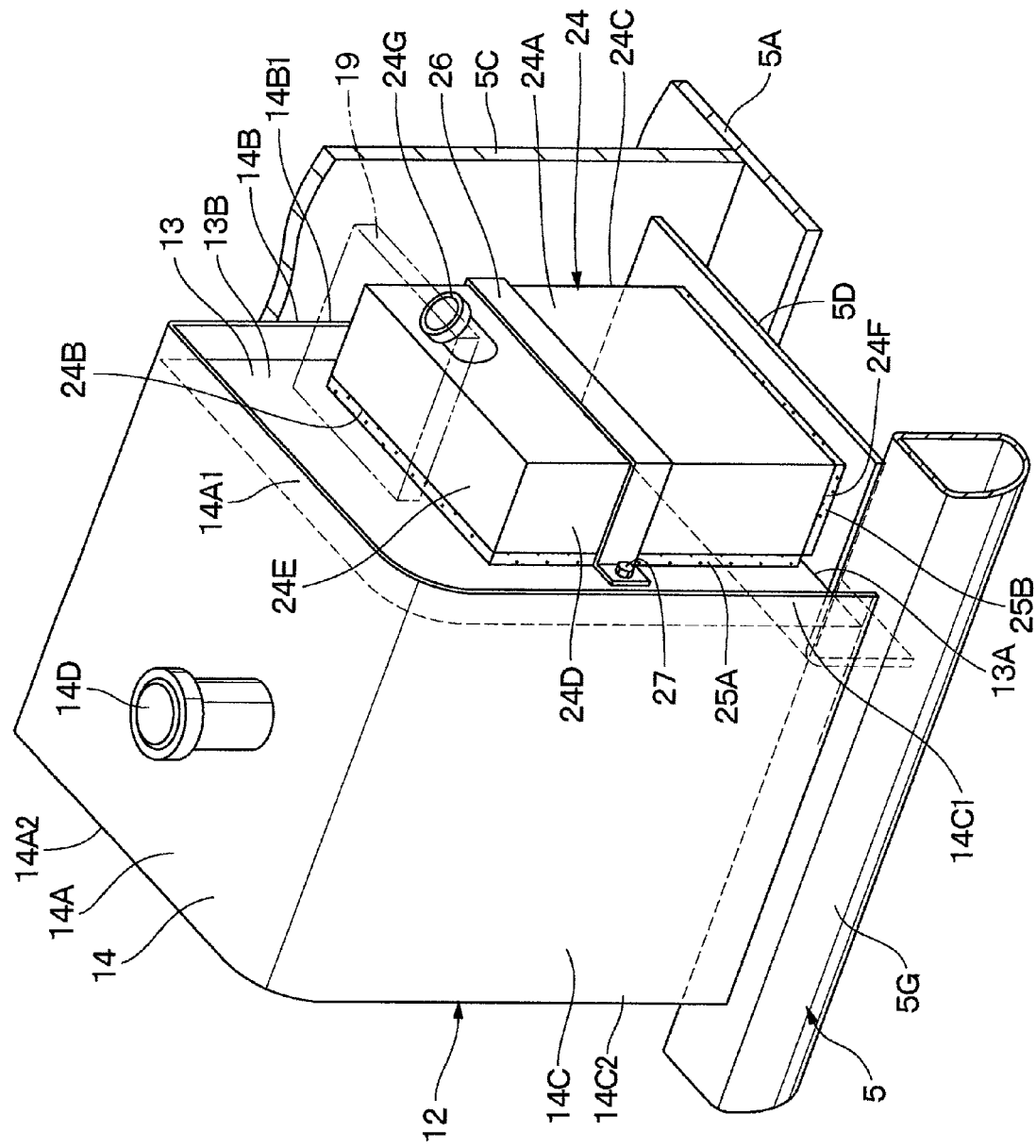
FIG. 4 is an enlarged perspective view of an essential portion showing a fuel tank, a urea water tank, and a part of a revolving frame.
Figure 5:
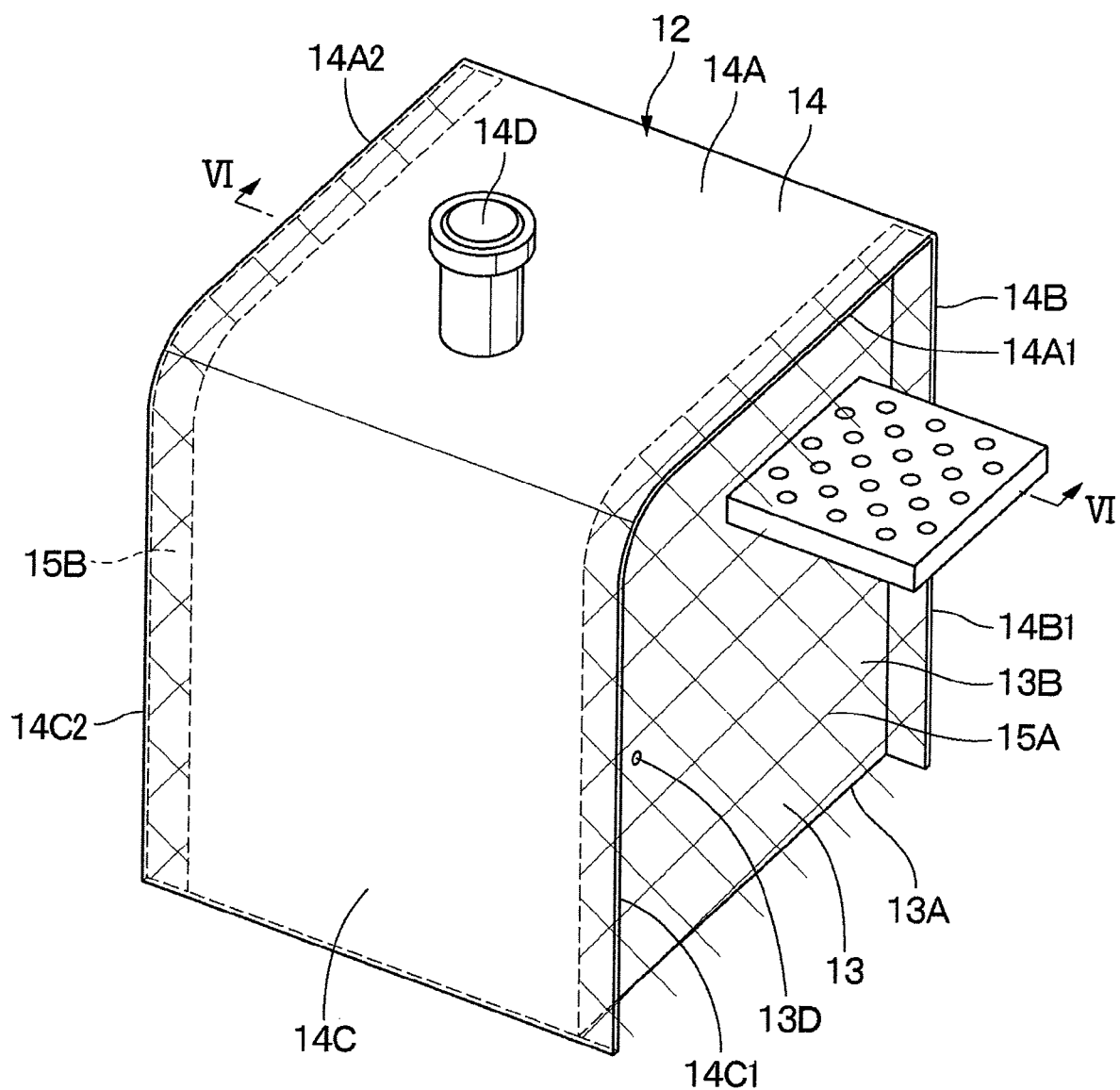
FIG. 5 is an external perspective view showing the fuel tank as a unit.
Figure 6:
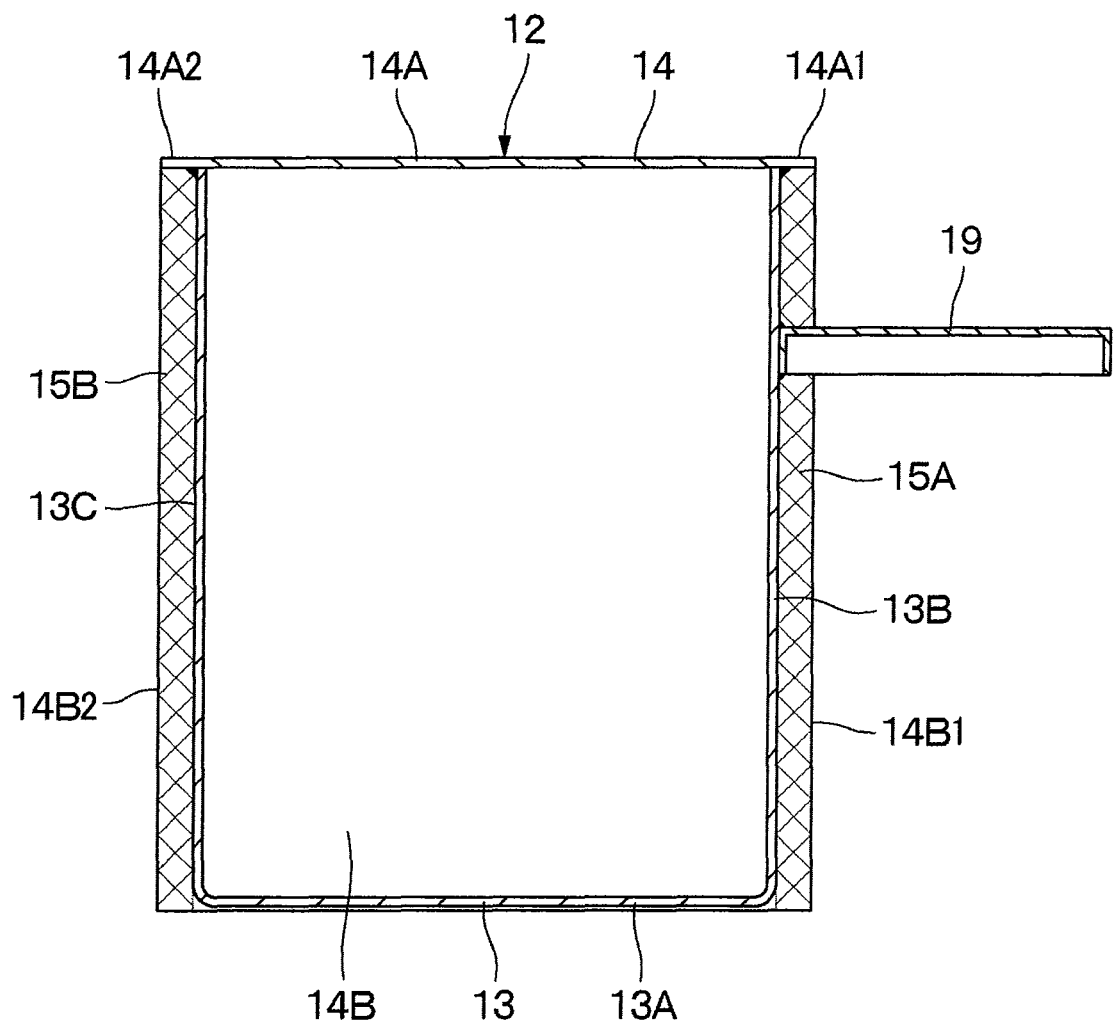
FIG. 6 is a longitudinal sectional view showing the fuel tank, taken in the direction of the arrows VI-VI of FIG. 5.

In FIG. 4, designated at 24 is the urea water tank for reserving the urea solution to be injected upstream of the urea selective reduction catalyst 23B. The urea water tank 24 is positioned in the outer peripheral side (front side) of the front surface plate 13B of the first plate 13 constituting the fuel tank 12 to be arranged in such a manner as to enter into the front surplus space portion 15A projected in the upper and lower directions in a range of the front flange portion 14A1 of the top surface plate 14A and projected in the right and left directions in a range of the front flange portions 14B1 and 14C1 of the left surface plate 14B and the right surface plate 14C.

Specially, the urea water tank 24 is formed flatly in the front and rear directions as a boxy casing as having a height dimension to the extent that it can be accommodated under the third step plate 19 and is arranged along the front side of the fuel tank 12 in a state of being concealed by the front cover 20. The urea water tank 24 is constituted by a front surface portion 24A, a rear surface portion 24B, a left surface portion 24C, a right surface portion 24D, a top surface portion 24E, and a bottom surface portion 24F, and a water supply port 24G for supplying the urea water is provided in the top position of the front surface portion 24A.

Indicated at 25A and 25B are plate-shaped cushion materials having resilience and vibration absorbing properties. The cushion materials 25A and 25B respectively are fixed to the rear surface portion 24B and the bottom surface portion 24F of the urea water tank 24. The cushion material 25A makes contact with the front surface plate 13B of the first plate 13 constituting the fuel tank 12, and the cushion material 25B makes contact with the extension beam 5D of the revolving frame 5. Each of the cushion materials 25A and 25B prevents a vibration at the time of an excavating operation of the hydraulic excavator 1 and a vibration of the engine 6 from being transmitted to the urea water tank 24.

Figure 9:
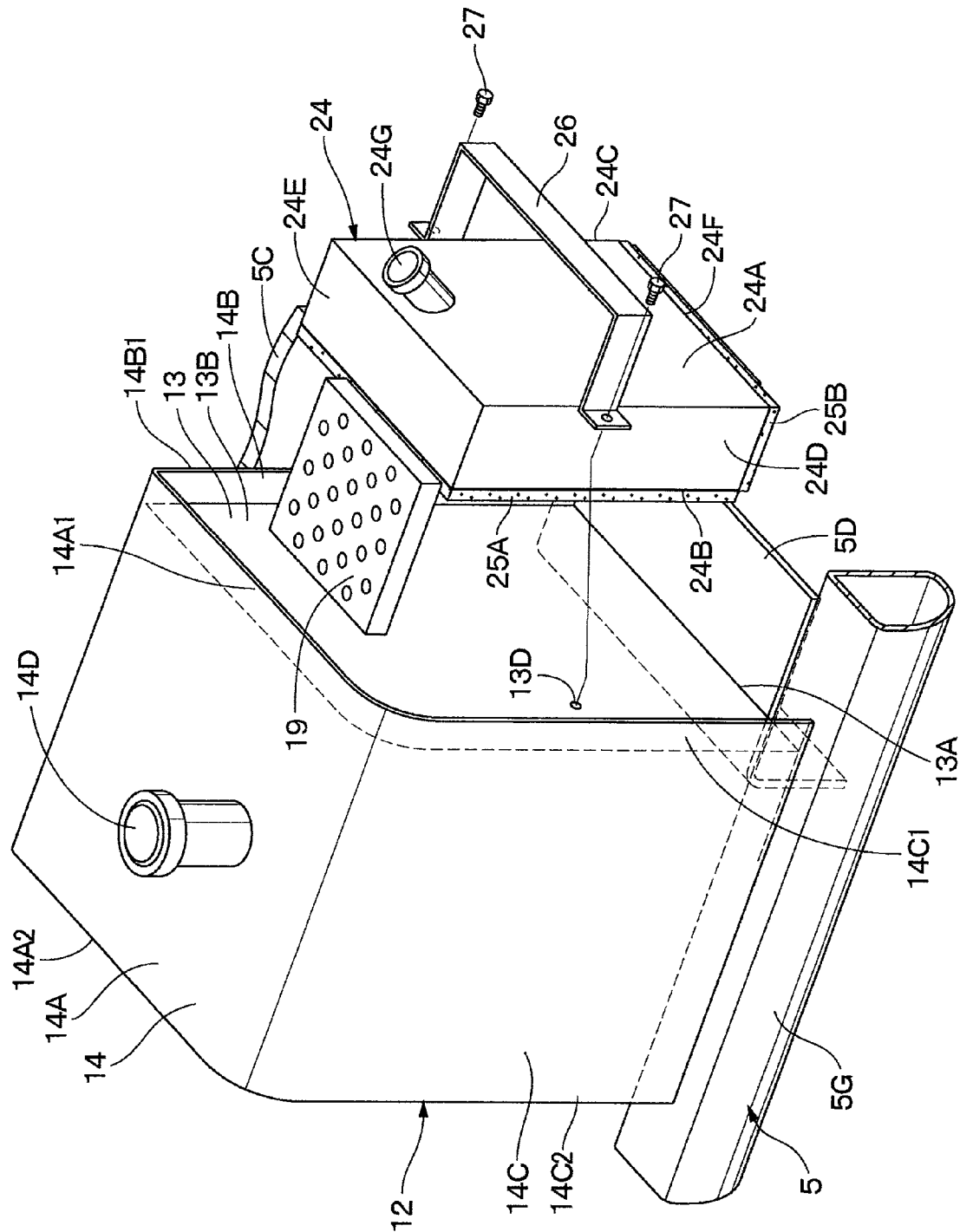
FIG. 9 is an enlarged perspective view of an essential portion showing a state where the urea water tank is separated from the fuel tank.

Meanwhile, as shown in FIG. 9, a fixing member 26 formed by folding a long plate in a substantially U-shape is arranged in the urea water tank 24 in such a manner as to hold it from forward. For mounting the urea water tank 24 on the fuel tank 12, bolts 27 inserted into both end portions of the fixing member 26 are screwed into the screw holes 13D provided in the front surface plate 13B, and thus the urea water tank 24 can be mounted on the fuel tank 12 to be disposed along the front side thereof. In this state, each of the cushion materials 25A and 25B can fix the fuel tank 12 and the urea water tank 24 without any gap therebetween and prevent an external vibration from being transmitted to the urea water tank 24.

Here, since the urea water tank 24 according to the first embodiment is arranged between the fuel tank 12 and the article accommodating box 16 and the rear side portion thereof enters into the front surplus space portion 15A formed in the front side of the fuel tank 12, the urea water tank 24 can have a capacity to the extent that the amount of the urea water required for a long time of working can be reserved without downsizing the article accommodating box 16. In addition, the urea water tank 24 can be securely fixed to the fuel tank 12 without any gap therebetween by the respective cushion materials 25A and 25B. Meanwhile, since the urea water tank 24 is arranged along the front side of the fuel tank 12, the urea water can be easily supplied by using the respective step plates 17, 18, and 19 disposed for facilitating a fuel filling operation to the fuel tank 12. Further, since urea water tank 24 can be concealed by the front cover 20, the external appearance can be improved.

Indicated at 28 is the connecting pipe provided for connection between the urea water tank 24 and the urea water injection valve 23D. The supply pump 29 is provided in the halfway of the connecting pipe 28. Therefore, the urea water in the urea water tank 24 can be supplied in a pressurized state to the urea water injection valve 23D through the connecting pipe 28.

The hydraulic excavator 1 according to the first embodiment has the aforementioned construction, and next, an operation thereof will be explained.

An operator boards at the cab 10 and starts the engine 6 to drive the hydraulic pump 9. By operating the lever or the like for travelling, the lower traveling structure 2 can be forwarded or retreated. On the other hand, by operating the lever for working, the working mechanism 4 can be tilted to perform an excavating operation of earth and sand.

At an operating time of the engine 6, particulate matter (PM) and nitrogen oxides (NOx) as harmful substances are discharged from the exhaust pipe 7. Therefore, the PM trapping device 22 removes the particulate matter. Next, the NOx purifying device 23 removes the nitrogen oxides. Namely, for removing the nitrogen oxides by the NOx purifying device 23, the urea solution in the urea water tank 24 is supplied to the urea water injection valve 23D of the NOx purifying device 23 from the connecting pipe 28 by using the supply pump 29. The NOx purifying device 23 injects the urea solution as the reducing agent into the exhaust gas from the urea water injection valve 23D to generate ammonia. Therefore, the urea selective reduction catalyst 23B reduces the nitrogen oxides to water and nitrogen and the oxidation catalyst 23C removes the ammonia in the exhaust gas. Thereafter, the purified exhaust gas is discharged to an outside, thus making it possible to remove a discharge amount of the nitrogen oxides.

In a case of resupplying the urea water to the urea water tank 24, in the same way as in a case of resupplying the fuel to the fuel tank 12, an operator steps on the first step plate 17 from the lower traveling structure 2 and can easily resupply the urea water from the water supply port 24G arranged under the third step plate 19.

As such, according to the first embodiment, the fuel tank 12 extends the front flange portion 14A1 of the top surface plate 14A in the second plate 14 furthermore to an outside in relation to the front surface plate 13B in the first plate 13 as the side surface plate and likewise extends the front flange portion 14B1 of the left surface plate 14B and the front flange portion 14C1 of the right surface plate 14C furthermore to an outside. As a result, the front surplus space portion 15A projected in the upper and lower directions in a range of the front flange portion 14A1 of the top surface plate 14A and projected in the right and left directions in a range between the front flange portions 14B1 and 14C1 of the left surface plate 14B and the right surface plate 14C is formed in the front surface side of the front surface plate 13B. Further, the urea water tank 24 is arranged along the fuel tank 12 in such a manner that the rear side portion thereof enters into the front surplus space portion 15A.

Accordingly, the urea water tank 24 enters into the front surplus space portion 15A by using the front surplus space portion 15A formed in the fuel tank 12, and therefore, the capacity of the urea water can be increased without accommodating the urea water tank 24 into the article accommodating box 16 or downsizing the article accommodating box 16.

As a result, even in a case of increasing the tank capacity of the urea water tank 24, since the accommodating space in the article accommodating box 16 can be secured largely, tools, consumables and the like can be sufficiently accommodated therein. In addition, since the urea water tank 24 is arranged along the fuel tank 12, an operator can have easy access to the urea water tank 24 at the time of filling the urea water therein by using the first step plate 17 provided for supplying the fuel to the fuel tank 12, and thus the operational efficiency at the time of supplying the urea water can be improved.

Further, since the urea water tank 24 is arranged between the fuel tank 12 and the article accommodating box 16, the space portion formed between the fuel tank 12 and the article accommodating box 16 in addition to the front surplus space portion 15A can be used as the installation space to furthermore increase the capacity.

On the other hand, the fuel tank 12 according to the first embodiment is formed by connecting the U-shaped first plate 13 in which the front surface plate 13B and the rear surface plate 13C each extend upward from the both sides of the bottom surface plate 13A in the front and rear directions to the reverse U-shaped second plate 14 which has the dimension L2 in the front and rear directions larger than the dimension L1 of the first plate 13 in the front and rear directions and in which the left surface plate 14B and the right surface plate 14C each extend downward from the both sides of the top surface plate 14A in the right and left directions. Therefore, the hollow container can be easily formed by the two plates 13 and 14.

In this case, the front flange portion 14A1 extending the furthermore to the front side in relation to the front surface plate 13B and the rear flange portion 14A2 extending furthermore to the rear side in relation to the rear surface plate 13C can be formed in the top surface plate 14A by a dimension difference between the first plate 13 and the second plate 14 in the front and rear directions. Similarly, the front flange portions 14B1 and 14C1 extending furthermore to the front side in relation to the front surface plate 13B and the rear flange portions 14B2 and 14C2 extending furthermore to the rear side in relation to the rear surface plate 13C can be formed in the left surface plate 14B and the right surface plate 14C. Therefore, the front surplus space portion 15A projected in the upper and lower directions and in the right and left directions in a range of the front flange portions 14A1, 14B1, and 14C1 can be formed, and the rear surplus space portion 15B projected in the upper and lower directions and in the right and left directions in a range of the rear flange portions 14A2, 14B2, and 14C2 can be formed.

Therefore, the urea water tank 24 can be positioned in the outer peripheral side of the front surface plate 13B of the fuel tank 12 to be arranged in such a manner as to enter into the front surplus space portion 15A projected in the upper and lower directions in a range of the front flange portion 14A1 of the top surface plate 14A and projected in the right and left directions in a range between the front flange portions 14B1 and 14C1 of the left surface plate 14B and in the right surface plate 14C. Consequently, the urea water tank 24 having a large tank capacity can be arranged without sacrificing the installation space of the circumferential members such as the article accommodating box 16.

On the other hand, the front cover 20 for covering the portion between the fuel tank 12 and the article accommodating box 16 is provided between the fuel tank 12 and the article accommodating box 16, and the urea water tank 24 is arranged in a state of being concealed by the front cover 20. With this arrangement, the urea water tank 24 can be concealed by the front cover 20 to improve the external appearance.

Further, the cushion material 25A is provided between the fuel tank 12 and the urea water tank 24, and the cushion material 25B is provided between the revolving frame 5 and the urea water tank 24. With this arrangement, the vibration generated at a traveling time or at an operating time of the hydraulic excavator 1 and the vibration generated by the engine 6 can be absorbed by the cushion materials 25A and 25B to improve durability of the urea water tank 24.

Figure 11:
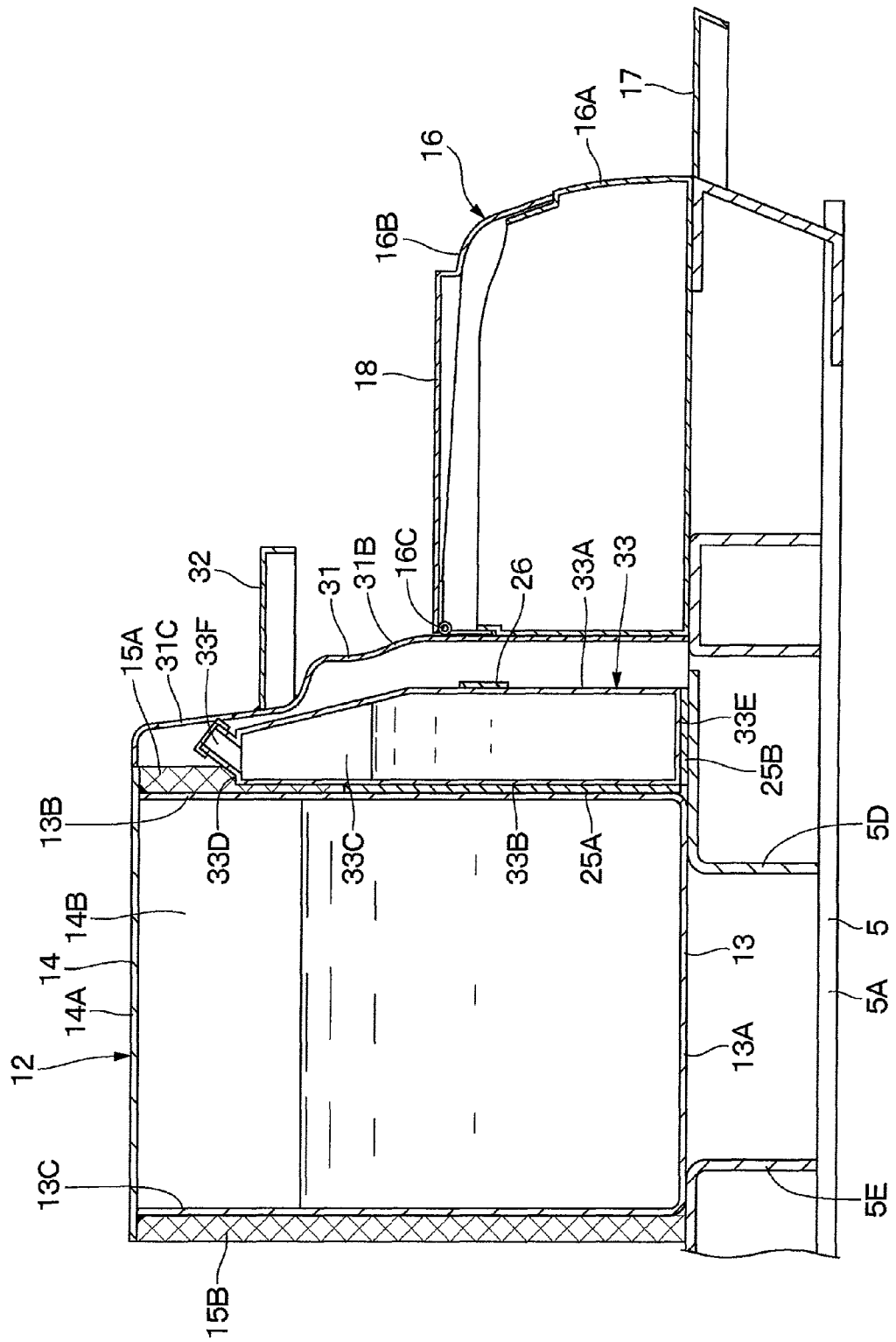
FIG. 11 is a longitudinal sectional view showing a urea water tank according to a second embodiment of the present invention as viewed from a position similar to that of FIG. 8.

Next, FIG. 11 shows a second embodiment according to the present invention. The present embodiment is characterized in that a urea water tank is formed to be higher than a third step plate. It should be noted that in the second embodiment, the component elements that are identical to those of the foregoing first embodiment will be simply denoted by the same reference numerals to avoid repetitions of similar explanations.

Indicated at 31 is a front cover in the second embodiment used instead of the front cover 20 according to the first embodiment. The front cover 31 is formed of a side surface portion (not shown) and a front surface portion 31B in the substantially same way as the front cover 20 according to the first embodiment. However, a third step plate 32 is directly mounted to the front cover 31 according to the second embodiment without the step insert opening and a water supply opening 31C is provided in the front cover 31 at a position above the mounting portion of the third step plate 32.

Denoted at 33 is a urea water tank according to the second embodiment provided inside the front cover 31. The urea water tank 33 is arranged along the fuel tank 12 in such a manner as to enter into the front surplus space portion 15A. The urea water tank 33 is, in the substantially same way as the urea water tank 24 according to the first embodiment, formed as a boxy casing by a front surface portion 33A, a rear surface portion 33B, a left surface portion 33C, a right surface portion (not shown), a top surface portion 33D, and a bottom surface portion 33E. However, the urea water tank 33 according to the second embodiment differs from the urea water tank 24 according to the first embodiment on the two points that it is formed to have a height dimension larger than that of the third step plate 32 and that a water supply port 33F is provided in the top surface portion 33D.

As such, the second embodiment can also obtain the substantially same effect as that of the first embodiment mentioned before. Particularly in the second embodiment, since the urea water tank 33 is formed to have a larger height dimension, the tank capacity thereof can be furthermore increased.

Figure 12:
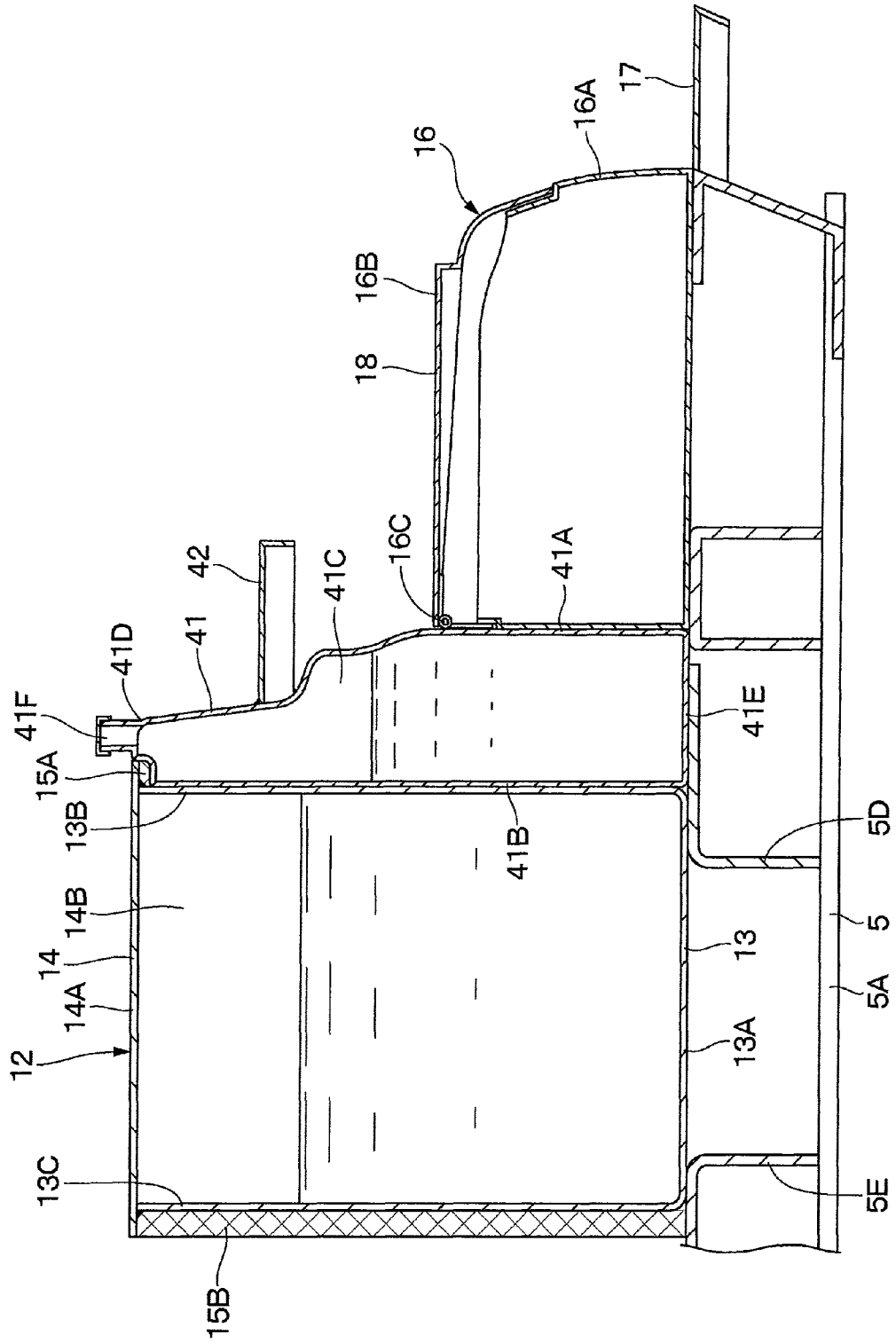
FIG. 12 is a longitudinal sectional view showing a urea water tank according to a third embodiment of the present invention as viewed from a position similar to that of FIG. 8.

Next, FIG. 12 shows a third embodiment according to the present invention. The present embodiment is characterized in that a urea water tank serves also as the front cover. It should be noted that in the third embodiment, the component elements that are identical to those of the foregoing first embodiment will be simply denoted by the same reference numerals to avoid repetitions of similar explanations.

Denoted at 41 is a urea water tank in the third embodiment used instead of the urea water tank 24 according to the first embodiment. The urea water tank 41 differs from the urea water tank 24 according to the first embodiment and is provided in a state of being exposed to an outside. Further, the urea water tank 41 is positioned between the fuel tank 12 and the article accommodating box 16 and is arranged along the fuel tank 12 in a state in which the rear side portion thereof enters into the front surplus space portion 15A.

Namely, the urea water tank 41 is formed as an irregular-shaped angular tubular casing by a front surface portion 41A, a rear surface portion 41B, a left surface portion 41C, a right surface portion (not shown), a top surface portion 41D, and a bottom surface portion 41E. The urea water tank 41 has a dimension in the front and rear directions slightly smaller than an interval dimension between the front surface plate 13B of the first plate 13 constituting the fuel tank 12 and the rear surface of the article accommodating box 16. Therefore, the urea water tank 41 can be formed to be large in size in the front and rear directions.

The upper side portion of the front surface portion 41A is inclined backward in the upper direction in the substantially same way as the upper side portion of the front cover 20 according to the first embodiment and establishes a smooth connection between the fuel tank 12 and the article accommodating box 16. Therefore, the urea water tank 41 serves also as the front cover for establishing the smooth connection on the external appearance between the fuel tank 12 and the article accommodating box 16. Meanwhile, a water supply port 41F is provided in the top surface portion 41D and a third step plate 42 is mounted on the upper side portion of the front surface portion 41A.

As such, also in the third embodiment, the operational effect substantially similar to that of the first embodiment described before can be obtained. Particularly in the third embodiment, the tank capacity of the urea water tank 41 can be maximized in a range of the front surplus space portion 15A. In addition, since the urea water tank 41 serves also as the front cover, the number of the components can be reduced to improve assembly operability and the like.

Figure 13:
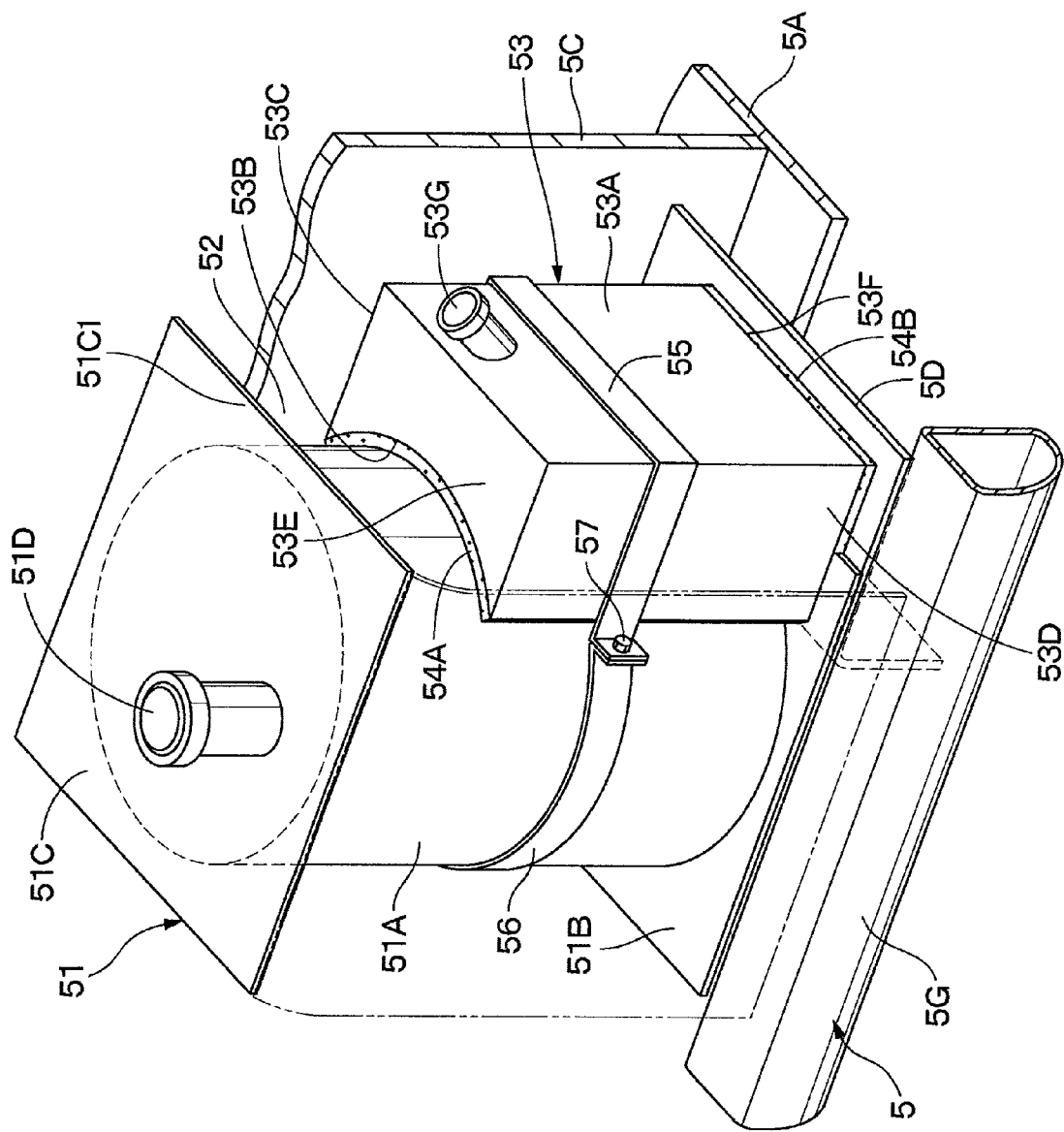
FIG. 13 is a perspective view showing a fuel tank, a urea water tank, and the like according to a fourth embodiment of the present invention.

Next, FIG. 13 shows a fourth embodiment according to the present invention. The present embodiment is characterized in that a side surface plate forming an outer peripheral surface of an oil reservoir tank is formed in a cylindrical shape. It should be noted that in the fourth embodiment, the component elements that are identical to those of the foregoing first embodiment will be simply denoted by the same reference numerals to avoid repetitions of similar explanations.

Denoted at 51 is a fuel tank as an oil reservoir tank according to the fourth embodiment used instead of the fuel tank 12 according to the first embodiment. The fuel tank 51 is formed by a cylindrical side surface plate 51A forming an outer peripheral surface, a rectangular bottom surface plate 51B closing a bottom surface of the side surface plate 51A, and a rectangular top surface plate 51C closing a top surface of the side surface plate 51A and having a flange portion 51C1 extending furthermore to an outside in relation to the side surface plate 51A. A ring-shaped surplus space portion 52 projected in the upper and lower directions in a range of the flange portion 51C1 of the top surface plate 51C is formed in an outer peripheral surface side of the side surface plate 51A.

Denoted at 53 is a urea water tank 53 according to the fourth embodiment provided along the front side of the fuel tank 51. The urea water tank 53 is, in the substantially same way as the urea water tank 24 according to the first embodiment, formed as a boxy casing by a front surface portion 53A, a rear surface portion 53B, a left surface portion 53C, a right surface portion 53D, a top surface portion 53E, and a bottom surface portion 53F. However, in the urea water tank 53 according to the fourth embodiment, a rear surface portion 53B facing the side surface plate 51A of the fuel tank 51 formed in a cylindrical shape is formed in a concave arc shape in such a manner as to correspond to the cylindrical shape of the side surface plate 51A. In addition, a water supply port 53G is provided in the upper side position of the front surface portion 53A.

On the other hand, in the urea water tank 53, a cushion material 54A is fixed to the rear surface portion 53B and a cushion material 54B is fixed to the bottom surface portion 53F. For mounting the urea water tank 53 and the fuel tank 51, the cushion material 54A is made in contact with the side surface plate 51A of the fuel tank 51 and the cushion material 54B is made in contact with the extension beam 5D of the revolving frame 5. In this case, the urea water tank 53 is arranged in such a manner as to enter into the front side portion between the fuel tank 51 and the article accommodating box 16 among the ring-shaped surplus space portion 52 (portion corresponding to a position of the front surplus space portion 15A in the first embodiment). In this state, the urea water tank 53 can be fixed in such a manner as to be positioned along the front side of the fuel tank 51 by mounting a fixing member 55 formed by folding a long plate in a substantially U-shape on a belt 56 wound around the side surface plate 51A by using bolts 57.

As such, also in the fourth embodiment, the operational effect substantially similar to that of the first embodiment described before can be obtained. Particularly in the fourth embodiment, the urea water tank 53 can be arranged also to the fuel tank 51 equipped with the cylindrical side surface plate 51A in a state of having entered into the front side in the ring-shaped surplus space portion 52.

Figure 14:
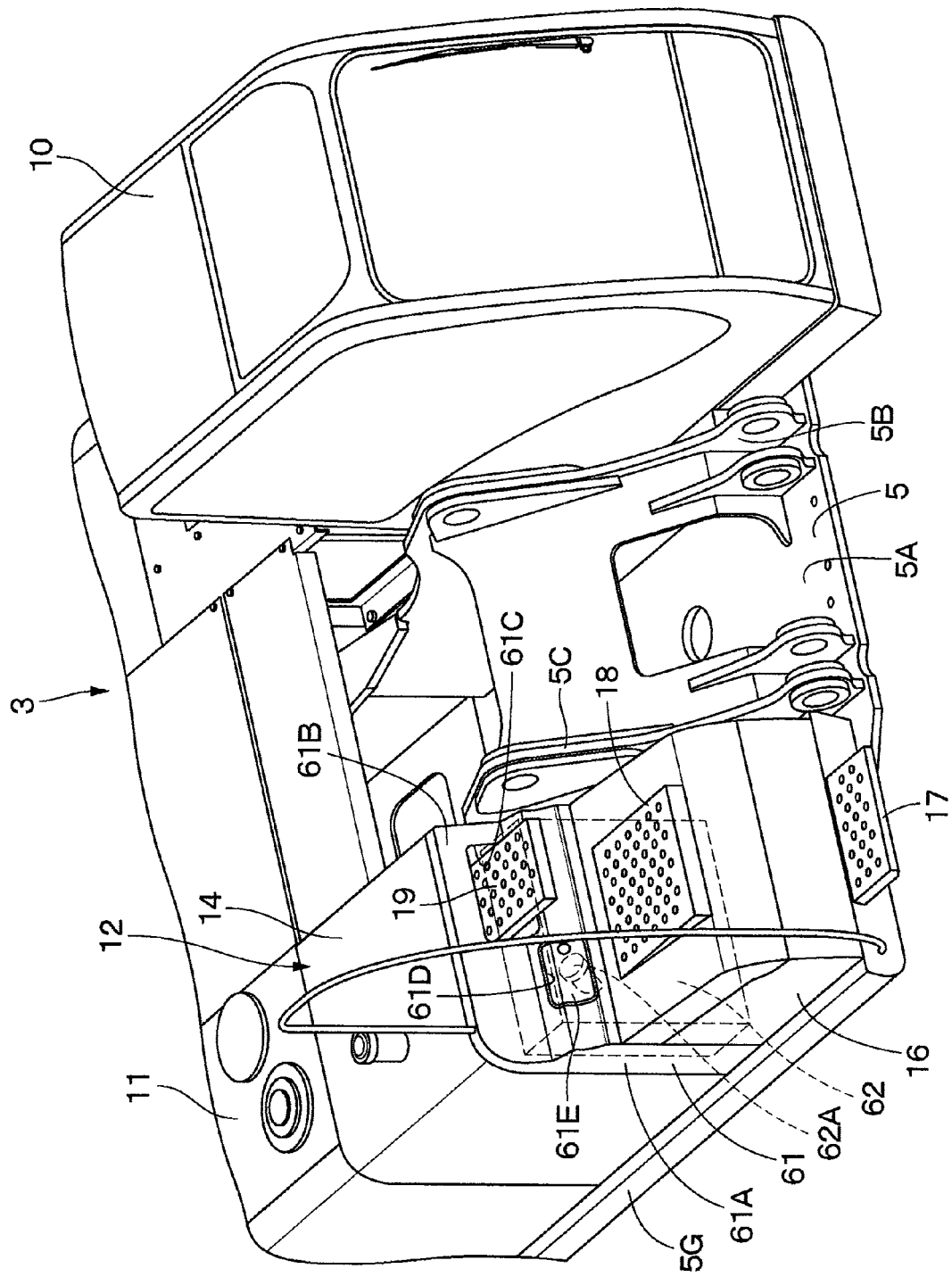
FIG. 14 is a perspective view showing a urea water tank and the like according to a fifth embodiment of the present invention as viewed from a position similar to that of FIG. 3.

Next, FIG. 14 shows a fifth embodiment according to the present invention. The present embodiment is characterized in that a water supply opening is arranged closer to the right side of a front cover. It should be noted that in the fifth embodiment, the component elements that are identical to those of the foregoing first embodiment will be simply denoted by the same reference numerals to avoid repetitions of similar explanations.

Indicated at 61 is a front cover in the fifth embodiment used instead of the front cover 20 according to the first embodiment. The front cover 61 is formed of a side surface portion 61A and a front surface portion 61B in the substantially same way as the front cover 20 according to the first embodiment, and a step insert opening 61C is provided in the upper side portion of the front surface portion 61B to be positioned closer to the left side for protruding the third step plate 19 forward. However, the front cover 61 according to the fifth embodiment differs from the front cover 20 according to the first embodiment in that a water supply opening 61D for exposing a water supply port 62A of a urea water tank 62 to be described later to an outside is provided closer to the right side.

Further, a lid member 61E for covering the water supply opening 61D is mounted in the water supply opening 61D of the front cover 61 to be capable of opening and closing. Therefore, the lid member 61E can cover the water supply port 62A for protection and improve an external appearance.

Denoted at 62 is the urea water tank (illustrated in a dotted line) according to the fifth embodiment provided in the front cover 61. The urea water tank 62 is constructed in the substantially same way as the urea water tank 24 according to the first embodiment. However, the urea water tank 62 according to the fifth embodiment differs from the urea water tank 24 according to the first embodiment in that the water supply port 62A is provided closer to the right side to correspond to the water supply opening 61D of the front cover 61.

As such, also in the fifth embodiment, the operational effect substantially similar to that of the first embodiment can be obtained. Particularly, according to the fifth embodiment, the water supply opening 61D of the front cover 61 is provided closer to the right side, different from the step insert opening 61C provided closer to the left side. Therefore, the water supply can be smoothly carried out from the water supply port 62A to the urea water tank 62 without interruption of the third step plate 19. Further, since the lid member 61E is mounted to the water supply opening 61D, the lid member 61E can cover the water supply port 62A for protection and improve an external appearance.

Figure 15:
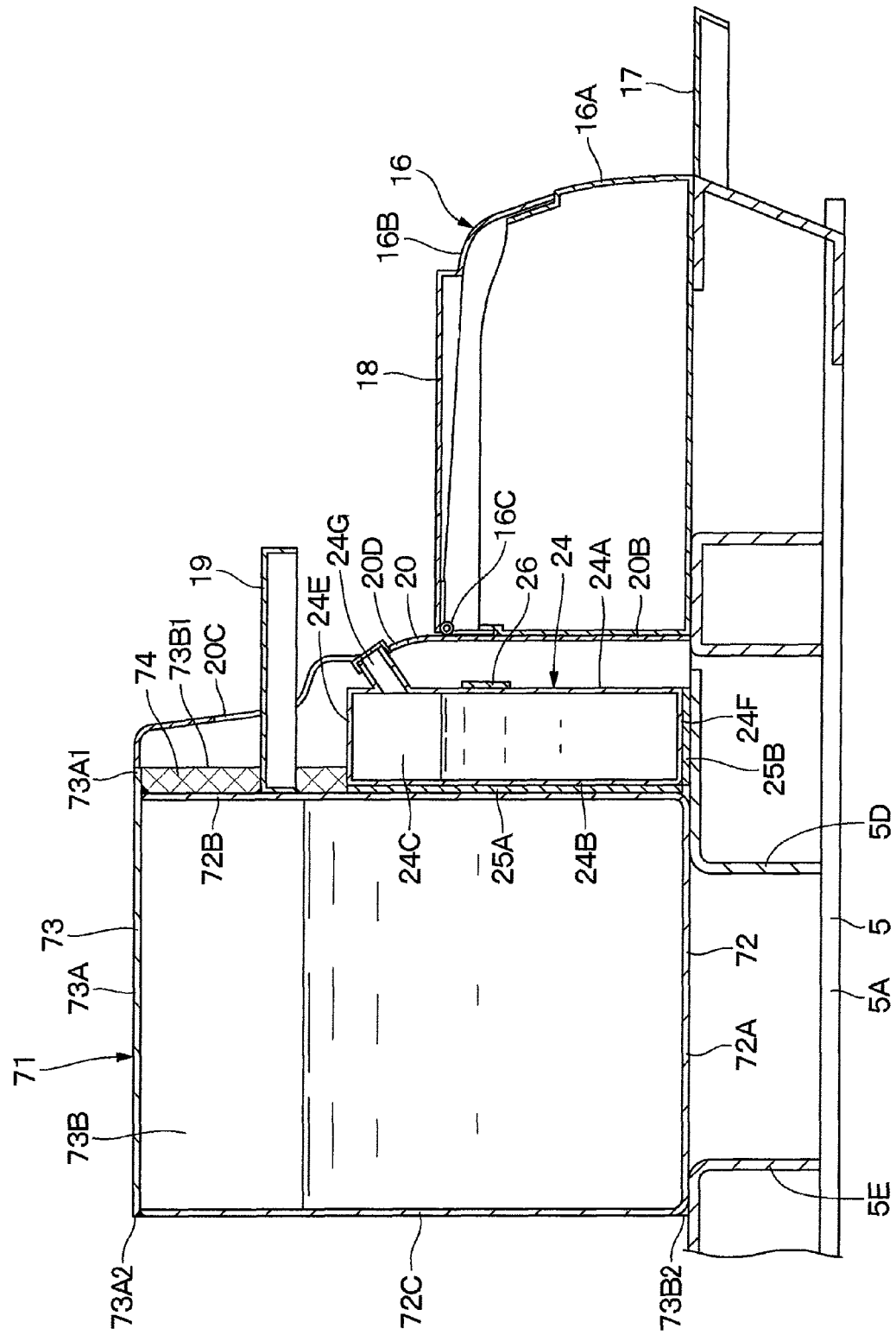
FIG. 15 is a longitudinal sectional view showing a fuel tank and the like according to a sixth embodiment of the present invention as viewed from a position similar to that of FIG. 8.

Next, FIG. 15 shows a sixth embodiment according to the present invention. The present embodiment is characterized in that a front surplus space portion is provided only in the front side of an oil reservoir tank. It should be noted that in the sixth embodiment, the component elements that are identical to those of the foregoing first embodiment will be simply denoted by the same reference numerals to avoid repetitions of similar explanations.

Indicated at 71 is a fuel tank as an oil reservoir tank in the sixth embodiment used instead of the fuel tank 12 according to the first embodiment. The fuel tank 71 is, in the substantially same way as the fuel tank 12 according to the first embodiment, constituted by a first plate 72 formed by folding one sheet of a metallic plate carved out in a strip shape in a U-shape and a second plate 73 formed by folding one sheet of a metallic plate carved out in a strip shape in a reverse U-shape. Here, the first plate 72 is formed of a bottom surface plate 72A, a front surface plate 72B, and a rear surface plate 72C. On the other hand, the second plate 73 is formed of a top surface plate 73A, a left surface plate 73B, and a right surface plate (not shown).

The first plate 72 and the second plate 73 constituting the fuel tank 71 are constructed in such a manner that the front surface plate 72B and the rear surface plate 72C of the first plate 72 are arranged to be shifted by 90 degrees in the circumferential direction between the left surface plate 73B and the right surface plate of the second plate 73 for air and liquid-tightly welding a peripheral edge of the first plate 72 to the second plate 73. With this construction, the fuel tank 71 forms a side surface plate of an angular tubular shape whose outer peripheral surface is formed by the front surface plate 72B and the rear surface plate 72C of the first plate 72, and the left surface plate 73B and the right surface plate of the second plate 73.

At this time, in the front side of the fuel tank 71, the top surface plate 73A, the left surface plate 73B, and the right surface plate of the second plate 73 are constructed to extend furthermore to the front side in relation to the front surface plate 72B of the first plate 72, whereby the front portions of the top surface plate 73A, the left surface plate 73B, and the right surface plate constitute front flange portions 73A1 and 73B1. Namely, the front flange portions 73A1 and 73B1 is formed by the dimension difference caused by making a dimension of the second plate 73 in the front and rear directions longer than a dimension of the first plate 72 in the front and rear directions.

On the other hand, in the rear side of the fuel tank 71, a flange portion is not formed in each of the top surface plate 73A, the left surface plate 73B, and the right surface plate of the second plate 73 because of arranging the rear surface plate 72C of the first plate 72 to be substantially coincident with rear end edges 73A2 and 73B2 of the top surface plate 73A, the left surface plate 73B, and the right surface plate of the second plate 73 in the front and rear directions.

Denoted at 74 is a front surplus space portion formed in a front side position of the fuel tank 71, and the front surplus space portion 74 corresponds to a portion (portion shown in a lattice shape) projected in the upper and lower directions in a range of the front flange portion 73A1 of the top surface plate 73A and projected in the right and left directions in a range between the front flange portion 73B1 of the left surface plate 73B and the front flange portion of the right surface plate in the second plate 73. The urea water tank 24 is arranged in a state of having entered into the front surplus space portion 74.

As such, also in the sixth embodiment, the operational effect substantially similar to that of the first embodiment described before can be obtained. Particularly in the sixth embodiment, since the front surplus space portion 74 is formed in the front side position of the fuel tank 71, the urea water tank 24 can be accommodated inside the front surplus space portion 74. On the other hand, since the surplus space portion (flange portion) is not formed in the rear side portion of the fuel tank 71, the rear surface plate 72C of the first plate 72 can be arranged to be closer to the front surface of the operating oil tank 11 to achieve an increase in the tank capacity of the fuel tank 71 and the downsizing of the upper revolving structure 3, and the like.

Figure 16:
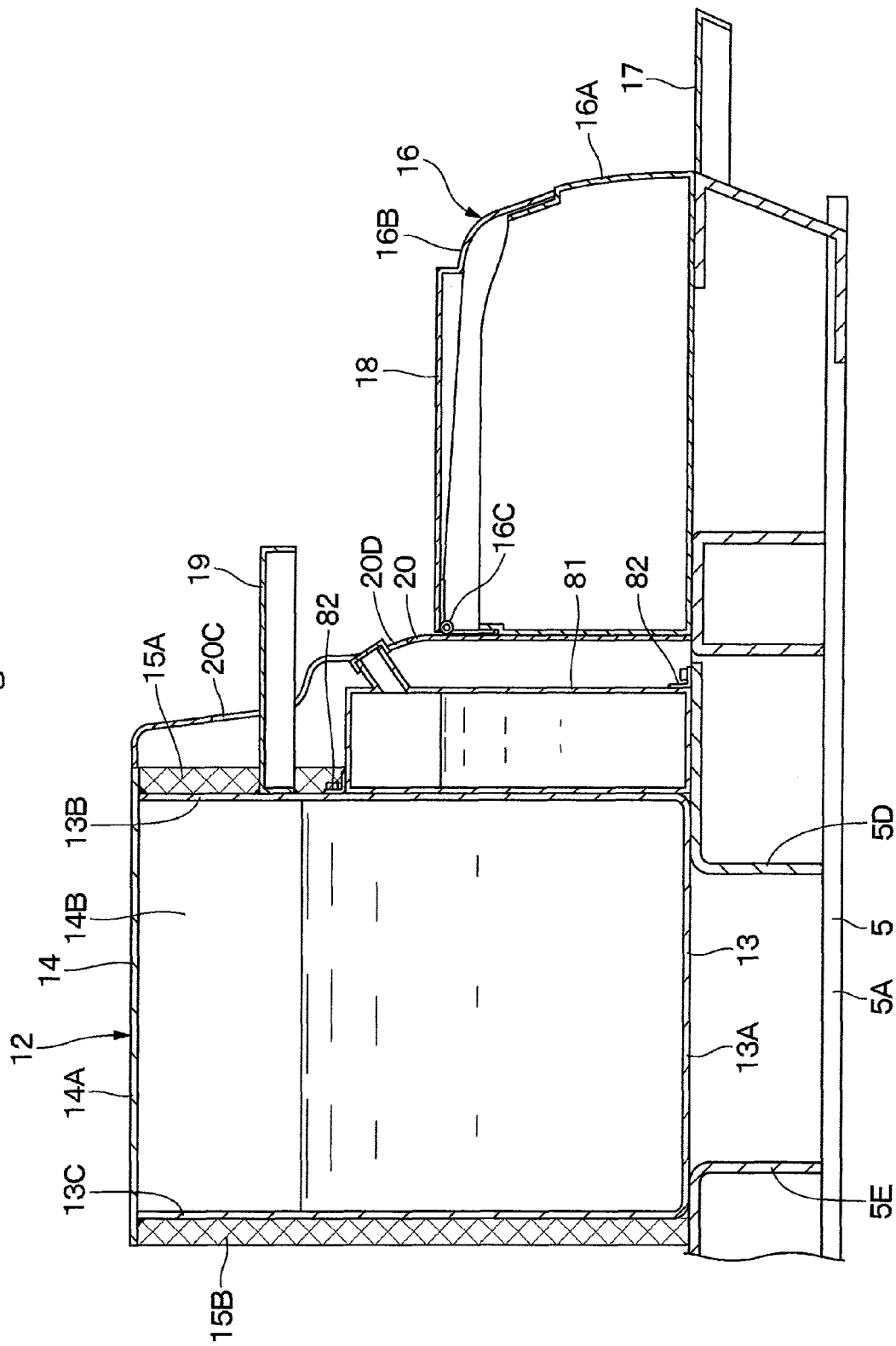
FIG. 16 is a longitudinal sectional view showing a urea water tank and the like according to a modification as viewed from a position similar to that of FIG. 8.

It should be noted that the explanation is made on the first embodiment by taking a case where the urea water tank 24 is fixed so as to be positioned along the front side of the fuel tank 12 by using the fixing member 26 formed by folding the long plate to be in a substantially U-shape, as an example. However, the present invention is not limited to this particular example. For instance, in the case of a modification shown in FIG. 16, a urea water tank 81 may be constructed to be bolted to the fuel tank 12 and the revolving frame 5 by using mount brackets 82. This construction may be applied similarly to the other embodiments.

In addition, the explanation is made on the first embodiment by taking a case where the fuel tank 12 for reserving fuel is shown as the reservoir tank and the urea water tank 24 is arranged in the front side of the fuel tank 12, as an example. However, the present invention is not limited to this particular example, and may be constructed such that the surplus space portion is provided in the operating oil tank 11 and the urea water tank 24 is arranged in such a manner as to enter into the surplus space portion. This construction may be applied similarly to the other embodiments.

Further, each of the embodiments described above exemplifies the crawler type hydraulic excavator 1 as the construction machine. However, the present invention is not limited to this particular example, and may be applied to a wheel type hydraulic excavator. In addition thereto, the present invention may be widely applied to other construction machines such as a wheel loader and a hydraulic crane.

Description of Reference Numerals
    1: Hydraulic excavator (construction machine)
    2: Lower traveling structure (traveling structure)
    3: Upper revolving structure (traveling structure)
    5: Revolving frame (support frame)
    6: Engine
    7: Exhaust pipe
    11: Operating oil tank (oil reservoir tank)
    12, 51, 71: Fuel tank (oil reservoir tank)
    13, 72: First plate
    13A, 51B, 72A: Bottom surface plate
    13B, 72B: Front surface plate (side surface plate)
    13C, 72C: Rear surface plate (side surface plate)
    14, 73: Second plate
    14A, 51C, 73A: Top surface plate
    14A1, 14B1, 14C1, 73A1, 73B1: Front flange portion
    14A2, 14B2, 14C2: Rear flange portion
    51C1: Flange portion
    14B, 73B: Left surface plate (side surface plate)
    14C: Right surface plate (side surface plate)
    14D: Fuel filling opening
    15A, 74: Front surplus space portion
    15B: Rear surplus space portion
    52: Ring-shaped surplus space portion
    16: Article accommodating box
    17, 18, 19, 32, 42: Step plate
    20, 31, 61: Front cover
    21: Post-treatment device
    23: NOx purifying device
    23A: Accommodating tubular casing
    23B: Urea selective reduction catalyst
    23C: Oxidation catalyst
    23D: Urea water injection valve
    24, 33, 41, 53, 62, 81: Urea water tank
    24A, 33A, 41A, 53A: Front surface plate
    24B, 33B, 41B, 53B: Rear surface plate
    24C, 33C, 41C, 53C: Left surface plate
    24D, 53D: Right surface plate
    24E, 33D, 41D, 53E: Top surface plate
    24F, 33E, 41E, 53F: Bottom surface plate
    24G, 33F, 41F, 53G, 62A: Water supply port
    25A, 25B, 54A, 54B: Cushion material
    28: Connecting pipe
    51A: Side surface plate
    L1: Dimension of first plate in front and rear directions
    L2: Dimension of second plate in front and rear directions

What is claimed is:

1. A construction machine comprising:
a support frame forming a support structural member for a traveling structure of the construction machine;
an engine mounted at a rear side of said support frame;
a cab positioned at a front side of said support frame and arranged on one side of right and left directions of said support frame and into which cab an operator can board;
an oil reservoir tank arranged on said support frame on an other side of the right and left directions thereof for reserving one of fuel to be supplied to said engine and operating oil to be used in a hydraulic system of the construction machine;
an article accommodating box provided on said support frame and positioned forward of a front side of said oil reservoir tank;
a NOx purifying device provided in an exhaust pipe of said engine and equipped with a urea selective reduction catalyst for removing nitrogen oxides in an exhaust gas;
a urea water tank formed of a hollow container for reserving urea water usable as a reducing agent in said NOx purifying device; and
a connecting pipe between said urea water tank and said exhaust pipe of said engine, said construction machine characterized in that:
said oil reservoir tank is formed having one of an angular tubular side surface plate and a cylindrical side surface plate forming an outer peripheral surface of said oil reservoir tank, a bottom surface plate closing a bottom surface of said side surface plate, and a top surface plate closing a top surface of said side surface plate and including a flange portion extending to an outside in relation to said side surface plate;
a surplus space portion being formed in a side of the outer peripheral surface of said side surface plate to be projected in upper and lower directions in a range of said flange portion of said top surface plate;
said urea water tank being arranged, with respect to said oil reservoir tank, in such a manner as to enter into said surplus space portion formed between said front side of said oil reservoir tank and said article accommodating box; and
a front cover which covers said urea water tank and by which said urea water tank is concealed from outside, said front cover being provided between said oil reservoir tank and said article accommodating box.

2. The construction machine according to claim 1, wherein said oil reservoir tank is formed in an angular tubular shape by connecting a first plate formed in a U-shape in which a front surface plate and a rear surface plate respectively extend upwards from both sides of said bottom surface plate in the front and rear directions to a second plate having a dimension in the front and rear directions larger than a dimension of said first plate in the front and rear directions and formed in a reverse U-shape, in which a left surface plate and a right surface plate respectively extend downwards from both sides of said top surface plate in the right and left directions, a front flange portion is formed in said top surface plate to extend furthermore to the front side in relation to said front surface plate by a dimension difference between said first plate and said second plate in the front and rear directions, and said urea water tank is positioned in an outer peripheral side of said front surface plate of said oil reservoir tank to be arranged in such a manner as to enter into a front surplus space portion projected in the upper and lower directions in a range of said front flange portion of said top surface plate.

3. The construction machine according to claim 1, wherein said oil reservoir tank is formed in an angular tubular shape by connecting a first plate formed in a U-shape in which a front surface plate and a rear surface plate respectively extend upwards from both sides of said bottom surface plate in the front and rear directions to a second plate having a dimension in the front and rear directions larger than a dimension of said first plate in the front and rear directions and formed in a reverse U-shape, in which a left surface plate and a right surface plate respectively extend downwards from both sides of said top surface plate in the right and left directions, a front flange portion is formed in each of said top surface plate, said left surface plate and said right surface plate to extend furthermore to the front side in relation to said front surface plate by a dimension difference between said first plate and said second plate in the front and rear directions, and said urea water tank is positioned in an outer peripheral side of said front surface plate of said oil reservoir tank to be arranged in such a manner as to enter into a front surplus space portion projected in the upper and lower directions in a range of said front flange portion of said top surface plate and projected in the right and left directions in a range between said front flange portions of said left surface plate and said right surface plate.

4. The construction machine according to claim 1, wherein a cushion material is provided between said side surface plate of said oil reservoir tank and a rear surface portion of said urea water tank to absorb external vibrations.

\* \* \* \* \*